(12) United States Patent
Kim et al.

(10) Patent No.: US 12,032,489 B2
(45) Date of Patent: Jul. 9, 2024

(54) INPUT OUTPUT MEMORY MANAGEMENT UNIT AND ELECTRONIC DEVICE HAVING THE SAME

(71) Applicant: SAMSUNG ELECTRONICS CO., LTD., Suwon-si (KR)

(72) Inventors: Youngseok Kim, Suwon-si (KR); Junbeom Jang, Suwon-si (KR); Seongmin Jo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/101,352

(22) Filed: Jan. 25, 2023

(65) Prior Publication Data
US 2023/0385203 A1    Nov. 30, 2023

(51) Int. Cl.
*G06F 12/10* (2016.01)
*G06F 12/1009* (2016.01)
*G06F 12/1027* (2016.01)

(52) U.S. Cl.
CPC ...... *G06F 12/1027* (2013.01); *G06F 12/1009* (2013.01)

(58) Field of Classification Search
CPC .. G06F 12/10; G06F 12/1009; G06F 12/1027; G06F 12/109; G06F 12/1036; G06F 12/0292; G06F 12/0802; G06F 3/061; G06F 3/0604; G06F 2212/651; G06F 2212/68; G06F 2212/684
See application file for complete search history.

(56) References Cited

U.S. PATENT DOCUMENTS

| | | | |
|---|---|---|---|
| 9,519,487 B2 | 12/2016 | Lee et al. | |
| 2011/0010521 A1 | 1/2011 | Wang et al. | |
| 2011/0161620 A1* | 6/2011 | Kaminski | G06F 12/1081 711/E12.001 |
| 2011/0202724 A1 | 8/2011 | Kegel et al. | |
| 2016/0246731 A1* | 8/2016 | Koob | G06F 1/32 |
| 2019/0196978 A1 | 6/2019 | Basu et al. | |

(Continued)

FOREIGN PATENT DOCUMENTS

KR  1020210012305 A   2/2021

OTHER PUBLICATIONS

Shin, S., et al., "Scheduling Page Table Walks for Irregular GPU Applications", ISCA, (2018), 13 pages.

*Primary Examiner* — Khoa D Doan
(74) *Attorney, Agent, or Firm* — Sughrue Mion, PLLC

(57) ABSTRACT

Disclosed is an input output memory management unit (IOMMU) including a first memory device including a translation lookaside buffer (TLB), a second memory device including a translation group table, a plurality of translation request controllers, each of which is configured to perform an address translation operation, and an allocation controller. The allocation controller may be configured to receive a first request including a first page table identifier (ID), a first virtual page number, and a first page offset, looks up the TLB by using the first page table ID and the first virtual page number, look up the translation group table by using the first page table ID and the first virtual page number when a TLB miss for the first request occurs, and allocate a first translation request controller among the plurality of translation request controllers based on a translation group table miss for the first request.

20 Claims, 18 Drawing Sheets

(56) References Cited

U.S. PATENT DOCUMENTS

| | | |
|---|---|---|
| 2019/0384722 A1 | 12/2019 | Basu et al. |
| 2020/0065255 A1 | 2/2020 | Lebeane et al. |
| 2021/0026553 A1 | 1/2021 | Kim et al. |
| 2021/0064525 A1 | 3/2021 | Tian et al. |
| 2021/0149818 A1* | 5/2021 | Venkataraman .... G06F 12/1009 |
| 2021/0240634 A1 | 8/2021 | Anderson et al. |

* cited by examiner

FIG. 4

Translation Group Table (241)

| TGT_ENTRY (FD1) | VALID (FD1) | Page Table ID (FD2) | VPN (FD3) | Head Pointer (FD4) | Tail Pointer (FD5) | NSRQ (FD6) | NSRQID (FD7) |
|---|---|---|---|---|---|---|---|
| TGT_ENTRY1 | 1 | PTID1 | VPN1 | 0 | 1 | 0 | 0 |

Head Pointer: Whenever PA is output, increase head pointer by +1
Tail Pointer: Whenever VA is received, increase tail pointer by +1

FIG. 8

Translation Group Table (241)

| TGT_ENTRY | VALID | Page Table ID | VPN | Head Pointer | Tail Pointer | NSRQ | NSRQID |
|---|---|---|---|---|---|---|---|
| TGT_ENTRY1 | 1 | PTID1 | VPN1 | 0 | 1 | 0 | 0 |

| | Head Pointer | Tail Pointer |
|---|---|---|
| S126 | 0 | 1 → 2 |
| S220 | 0 → 1 | 2 |
| S138 | 1 → 2 | 2 |
| S234 | 2 | 2 |

FIG. 11

Translation Group Table (241)

| TGT_ENTRY | VALID | Page Table ID | VPN | Head Pointer | Tail Pointer | MSRQ | NSRQID |
|---|---|---|---|---|---|---|---|
| TGT_ENTRY1 | 1 | PTID1 | VPN1 | 0 | 1 | 0 | 0 |
| TGT_ENTRY2 | 1 | PTID2 | VPN2 | 0 | 1 | 0 | 0 |

FIG. 13

| Page Table ID | Virtual Page Number(VPN) | Physical Page Number(PPN) |
|---|---|---|
| PTID1 | VPN1 | PPN1 |
| PTID2 | VPN2 | PPN2 |

TLB 231

FIG. 17

| TGT_ENTRY | VALID | Page Table ID | VPN | Head Pointer | Tail Pointer | NSRQ | NSRQID |
|---|---|---|---|---|---|---|---|
| TGT_ENTRY1 | 0→1→0 | PTID1 | VPN1 | 0→8 | 0→8 | 0→1→0 | 2 |
| TGT_ENTRY2 | 0→1 | PTID1 | VPN1 | 0→2 | 0→2 | 0 | 0 |

Translation Group Table

INPUT OUTPUT MEMORY MANAGEMENT UNIT AND ELECTRONIC DEVICE HAVING THE SAME

CROSS-REFERENCE TO RELATED APPLICATION

This application is based on and claims priority from Korean Patent Application No. 10-2022-0063752 filed on May 24, 2022, in the Korean Intellectual Property Office, the disclosure of which is incorporated by reference herein in its entirety.

BACKGROUND

1. Field

Embodiments of the present disclosure relate to an input output memory management unit (IOMMU), and more particularly, to an IOMMU that supports hit-under-miss and miss-under-miss by grouping requests, each of which includes the same page, and a device having the same.

2. Description of Related Art

A memory management unit (MMU) is associated with a central processing unit (CPU). The MMU is configured to translate a virtual address used by the CPU into a physical address corresponding to a system memory.

An IOMMU associated with input/output peripherals is used in a CPU-related system. To translate a virtual address to the corresponding physical address in the system memory, the IOMMU may search for translation information from the system memory in response to a request of a peripheral associated with the virtual address used by the peripheral.

As the complexity of a system on chip (SoC) increases, the types of hardware (H/W) accelerators (referred to as intellectual properties (IPs)) installed in the SoC also increase. Each of the IPs uses a shared virtual memory, and thus the IOMMU is required essentially.

Because it is impossible to provide one IOMMU for each IP in terms of area optimization, a plurality of IPs share one IOMMU with one another, and the one IOMMU provides an address translation service to the plurality of IPs. As the number of IPs receiving the address translation service increases in a structure where the one IOMMU provides the address translation service to the plurality of IPs, the IOMMU is required to translate addresses to a plurality of pages at the same time. Here, a page is a unit of address translation.

The IOMMU needs to perform a page-table walk (PTW) on a page table stored in a dynamic random access memory (DRAM) for address translation. To minimize a translation latency penalty for accessing the DRAM, the IOMMU includes a translation lookaside buffer (TLB). The TLB refers to a cache used to increase a speed at which a virtual address is translated into a physical address.

The IOMMU may include a PTW logic circuit that examines data of the system memory by performing PTW for the purpose of searching for necessary translation information. For example, when an input output peripheral requests information, which is not cached in the TLB of the IOMMU, a miss occurs in the TLB. When the miss occurs, the IOMMU obtains information from the system memory by using the PTW logic circuit.

SUMMARY

Various embodiments of the disclosure provide for an input output memory management unit (IOMMU) that supports hit-under-miss and miss-under-miss by grouping requests, each of which includes the same page, based on providing address translation to semiconductor IPs accessing different memory areas, and a device having the same.

According to an embodiment, an IOMMU includes: a first memory device comprising a translation lookaside buffer (TLB); a second memory device comprising a translation group table; a plurality of translation request controllers, wherein each of the plurality of translation request controllers is configured to perform an address translation operation; and an allocation controller configured to: receive a first request comprising a first page table identifier (ID), a first virtual page number, and a first page offset; look up the TLB by using the first page table ID and the first virtual page number; based on a TLB miss for the first request occurring, look up the translation group table by using the first page table ID and the first virtual page number; and based on a translation group table miss for the first request occurring, allocate a first translation request controller among the plurality of translation request controllers.

Based on the translation group table miss for the first request occurring, the allocation controller may be configured to store the first page table ID and the first virtual page number in a first entry of the translation group table and updates a tail pointer included in the first entry.

The IOMMU may further include: a third memory device comprising a plurality of sub-request queues, wherein the allocation controller may be configured to store the first page table ID, the first virtual page number, and the first page offset in a first sub-request queue among the plurality of sub-request queues.

Based on the translation group table miss for the first request occurring, the allocation controller may be configured to transmit the first page table ID, the first virtual page number, and the first page offset to the first translation request controller.

The first translation request controller may be configured to: obtain a first physical page number corresponding to the first virtual page number from an external memory device by using the first page table ID and the first virtual page number; store the first page table ID, the first virtual page number, and the first physical page number in the TLB; and after generating a first physical address comprising the first physical page number and the first page offset and transmitting the first physical address to the external memory device, update a head pointer included in the first entry.

The allocation controller may be configured to: receive a second request comprising a second page table ID, a second virtual page number, and a second page offset; look up the TLB by using the second page table ID and the second virtual page number; based on a TLB hit for the second request occurring, allocate a second translation request controller among the plurality of translation request controllers; and transmit the second page table ID, the second virtual page number, and the second page offset to the second translation request controller, and wherein the second translation request controller may be configured to: receive a second physical page number matched to the second virtual page number from the TLB; and generate a second physical address comprising the second physical page number and the second page offset and transmit the second physical address to the external memory device.

The allocation controller may be configured to: receive a second request comprising the first page table ID, the first virtual page number, and a second page offset; look up the TLB by using the first page table ID and the first virtual page number included in the second request; based on a TLB miss for the second request occurring, look up the translation group table by using the first page table ID and the first virtual page number included in the second request; and based on a translation group table hit for the second request occurring, update the tail pointer included in the first entry again.

The allocation controller may be configured to store the first page table ID, the first virtual page number, and the second page offset in the first sub-request queue.

The first translation request controller may be configured to: receive the first page table ID, the first virtual page number, and the second page offset output from the first sub-request queue; look up the TLB by using the first page table ID and the first virtual page number output from the first sub-request queue; receive a first physical page number matched to the first virtual page number from the TLB; and after generating a second physical address comprising the first physical page number and the second page offset and transmitting the second physical address to an external memory device, update a head pointer included in the first entry.

The allocation controller may be configured to: receive a second request comprising a second page table ID, a second virtual page number, and a second page offset; look up the TLB by using the second page table ID and the second virtual page number included in the second request; and look up the translation group table by using the second page table ID and the second virtual page number based on a TLB miss for the second request occurring, and allocate a second translation request controller among the plurality of translation request controllers based on a translation group table miss for the second request occurring.

Based on the translation group table miss for the second request occurring, the allocation controller may be configured to store the second page table ID and the second virtual page number in a second entry of the translation group table and updates a tail pointer included in the second entry, and wherein the allocation controller may be configured to store the second page table ID, the second virtual page number, and the second page offset in a second sub-request queue among the plurality of sub-request queues.

Based on the translation group table miss for the second request occurring, the allocation controller may be configured to transmit the second page table ID, the second virtual page number, and the second page offset to the second translation request controller, and wherein the second translation request controller may be configured to: obtain a second physical page number corresponding to the second virtual page number from an external memory device by using the second page table ID and the second virtual page number; store the second page table ID, the second virtual page number, and the second physical page number in the TLB; and after transmitting a second physical address comprising the second physical page number and the second page offset to the external memory device, update a head pointer included in the second entry.

According to an embodiment, a system on chip (SoC) includes: a first semiconductor intellectual property (IP); at least one second semiconductor IP; a memory device configured to store a first page table corresponding to a first page table ID; and an input output memory management unit (IOMMU) connected to the first semiconductor IP, the at least one second semiconductor IP, and the memory device. The IOMMU includes: a first memory device comprising a translation lookaside buffer (TLB); a second memory device comprising a translation group table; a third memory device comprising a plurality of sub-request queues; a plurality of translation request controllers, wherein each of the plurality of translation request controllers may be configured to translate a virtual address into a physical address; and an allocation controller. The allocation controller may be configured to: receive a first request comprising the first page table ID, a first virtual page number, and a first page offset from the first semiconductor IP; look up the TLB by using the first page table ID and the first virtual page number included in the first request; based on a TLB miss for the first request occurring, look up the translation group table by using the first page table ID and the first virtual page number included in the first request; based on a translation group table miss for the first request occurring, allocate a first translation request controller among the plurality of translation request controllers; store the first page table ID and the first virtual page number in a first entry of the translation group table and update a tail pointer included in the first entry; and store the first page table ID, the first virtual page number, and the first page offset in a first sub-request queue among the plurality of sub-request queues.

The allocation controller may be configured to: receive a second request comprising the first page table ID, the first virtual page number, and a second page offset from the first semiconductor IP or the at least one second semiconductor IP; look up the TLB by using the first page table ID and the first virtual page number included in the second request; based on a TLB miss for the second request occurring, look up the translation group table by using the first page table ID and the first virtual page number included in the second request; based on a translation group table hit for the second request occurring, allocate the first translation request controller among the plurality of translation request controllers; update the tail pointer of the first entry included in the translation group table again; and store the first page table ID, the first virtual page number, and the second page offset included in the second request, in the first sub-request queue.

The first translation request controller may be configured to: receive the first page table ID, the first virtual page number, and the first page offset included in the first request, from the allocation controller; obtain a first physical page number stored in the first page table by using the first page table ID and the first virtual page number included in the first request; store the first page table ID, the first virtual page number, and the first physical page number in the TLB; and output a first physical address comprising the first physical page number and the first page offset to the memory device.

The first translation request controller may be configured to: after the first physical address may be output to the memory device, receive the first page table ID, the first virtual page number, and the second page offset included in the second request, from the first sub-request queue; obtain the first physical page number from the TLB; and output a second physical address comprising the first physical page number and the second page offset to the memory device.

The first translation request controller may be configured to: after the first physical address may be output to the memory device, update a head pointer included in the first entry; and after the second physical address may be output to the memory device, update the head pointer again.

According to an embodiment, a data processing system includes: a system on chip (SoC) comprising a first semiconductor intellectual property (IP) and at least one second semiconductor IP; and a device connected to the first semiconductor IP or the at least one second semiconductor IP. The SoC includes: a memory device configured to store a first page table corresponding to a first page table identifier (ID); and an input output memory management unit (IOMMU) connected to the first semiconductor IP, the at least one second semiconductor IP, and the memory device. The IOMMU includes: a first memory device comprising a translation lookaside buffer (TLB); a second memory device comprising a translation group table; a third memory device comprising a plurality of sub-request queues; a plurality of translation request controllers, wherein each of the plurality of translation request controllers may be configured to translate a virtual address into a physical address; and an allocation controller. The allocation controller may be configured to: receive a first request comprising the first page table ID, a first virtual page number, and a first page offset from the first semiconductor IP; look up the TLB by using the first page table ID and the first virtual page number included in the first request; based on a TLB miss for the first request occurring, look up the translation group table by using the first page table ID and the first virtual page number included in the first request; based on a translation group table miss for the first request occurring, allocate a first translation request controller among the plurality of translation request controllers; store the first page table ID and the first virtual page number in a first entry of the translation group table and update a tail pointer included in the first entry; and store the first page table ID, the first virtual page number, and the first page offset in a first sub-request queue matched to the first translation request controller, from among the plurality of sub-request queues.

The allocation controller may be configured to: receive a second request comprising the first page table ID, the first virtual page number, and a second page offset from the first semiconductor IP or the at least one second semiconductor IP; look up the TLB by using the first page table ID and the first virtual page number included in the second request; based on a TLB miss for the second request occurring, look up the translation group table by using the first page table ID and the first virtual page number included in the second request; based on a translation group table hit for the second request occurring, allocate the first translation request controller among the plurality of translation request controllers; update the tail pointer of the first entry included in the translation group table again; and store the first page table ID, the first virtual page number, and the second page offset included in the second request, in the first sub-request queue.

The first translation request controller may be configured to: receive the first page table ID, the first virtual page number, and the first page offset included in the first request, from the allocation controller; obtain a first physical page number stored in the first page table by using the first page table ID and the first virtual page number included in the first request; store the first page table ID, the first virtual page number, and the first physical page number in the TLB; output a first physical address comprising the first physical page number and the first page offset to the memory device; after the first physical address is output to the memory device, receive the first page table ID, the first virtual page number, and the second page offset included in the second request, from the first sub-request queue; obtain the first physical page number from the TLB; output a second physical address comprising the first physical page number and the second page offset to the memory device; after the first physical address is output to the memory device, update a head pointer included in the first entry; and after the second physical address is output to the memory device, update the head pointer again.

BRIEF DESCRIPTION OF DRAWINGS

The above and other objects and features of the present disclosure will become apparent by describing in detail embodiments thereof with reference to the accompanying drawings.

FIG. 4 illustrates data stored in a translation group table, according to an embodiment.

FIG. 8 illustrates data stored in a translation group table based on a miss-under-miss operation under a first condition, according to an embodiment.

FIG. 11 illustrates data stored in a translation group table based on a miss-under-miss operation under a second condition, according to an embodiment.

FIG. 13 illustrates data stored in a TLB based on a miss-under-miss operation under a second condition, according to an embodiment.

FIG. 17 illustrates data stored in a translation group table according to successive requests for describing linked sub-request queues, according to an embodiment.

DETAILED DESCRIPTION

Figure 1:
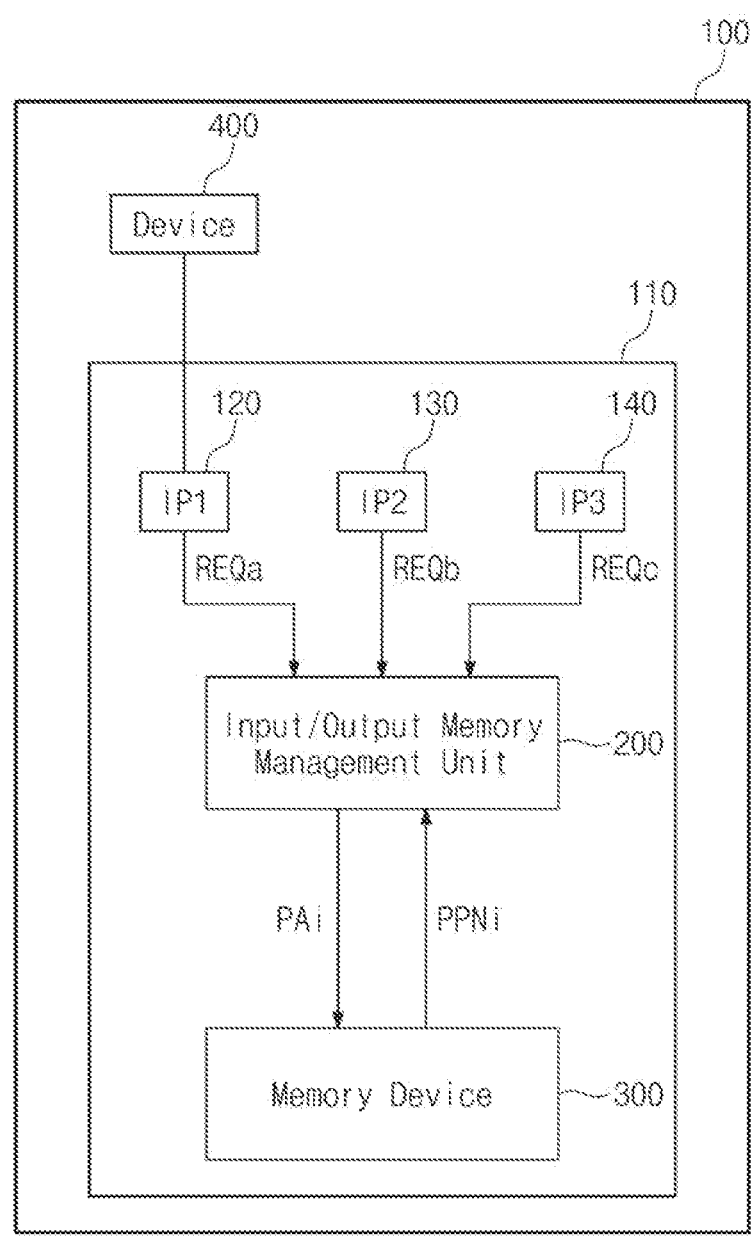
FIG. 1 is a block diagram of a data processing system including a system on chip (SoC) including an input output memory management unit (IOMMU), according to an embodiment.

The embodiments herein and the various features and advantageous details thereof are explained more fully with reference to the non-limiting embodiments that are illustrated in the accompanying drawings and detailed in the following description, where similar reference characters denote corresponding features consistently throughout. Descriptions of well-known components and processing techniques are omitted so as to not unnecessarily obscure the embodiments herein. Also, the various embodiments described herein are not necessarily mutually exclusive, as some embodiments may be combined with one or more other embodiments to form new embodiments. The examples used herein are intended merely to facilitate an understanding of ways in which the embodiments herein may be practiced and to further enable those skilled in the art to practice the embodiments herein. Accordingly, the examples should not be construed as limiting the scope of the embodiments herein.

In the disclosure, expressions such as "A or B," "at least one of A and/or B," or "one or more of A and/or B" may include all possible combinations of the items listed together. For example, "A or B," "at least one of A and B," or "at least one of A or B" may refer to all cases including (1) at least one A, (2) at least one B, or (3) both of at least one A and at least one B.

When a certain element (e.g., first element) is indicated as being "(operatively or communicatively) coupled with/to" or "connected to" another element (e.g., second element), it may be understood as the certain element being directly coupled with/to the another element or as being coupled through other element (e.g., third element). On the other hand, when a certain element (e.g., first element) is indicated as "directly coupled with/to" or "directly connected to" another element (e.g., second element), it may be understood as the other element (e.g., third element) not being present between the certain element and the another element.

When an input output memory management unit (IOMMU) translates a virtual address (virtual memory address) into a physical address (physical memory address), the IOMMU first searches for a translation lookaside buffer (TLB).

When the search in the TLB is successful (TLB hit), the IOMMU immediately translates the virtual address into the physical address, and a processor or process accesses the physical address.

However, when the search in the TLB fails (TLB miss), the IOMMU searches for whether the physical address mapped onto the virtual address is present in a page table of a system memory. The search process is referred to as a "page walk", "table walk", or "page table walk (PTW)". Hereinafter, the page walk, the table walk, or the page table walk is collectively referred to as a "page table walk".

An IOMMU according to an embodiment of the present disclosure includes a translation group table. A search failure for the translation group table is referred to as a "translation group table miss", and a search success for the translation group table is referred to as a "translation group table hit".

Hit-under-miss refers to an operation of the IOMMU that first processes a second address translation request of a second semiconductor intellectual property (IP) before a first address translation request of a first semiconductor IP when the IOMMU is capable of providing a TLB hit for the second address translation request output from the second semiconductor IP while the IOMMU performs PTW on the first address translation request output from the first semiconductor IP.

Miss-under-miss refers to an operation of the IOMMU, which simultaneously performs PTW on a third address translation request of a third semiconductor IP while performing PTW on the first address translation request of the first semiconductor IP.

FIG. 1 is a block diagram of a data processing system including a system on chip (SoC) including an IOMMU, according to an embodiment.

As shown in FIG. 1, a data processing system 100 includes a SoC 110 and a device 400. The data processing system 100 may be a PC, a mobile device, or an in-vehicle infotainment (IVI) system, but is not limited thereto.

Examples of the mobile device may include a smartphone, a tablet PC, a laptop computer, a mobile Internet device (MID), an Internet of Things (IoT) device, or a wearable computer.

The SoC 110 includes a plurality of semiconductor intellectual properties (IPs) 120, 130, and 140, a IOMMU 200, and a memory device 300.

A semiconductor IP means a unit of logic, a cell, or a chip layout design, which is capable of being reused by a creator party.

For example, the first semiconductor IP 120 may be a display processing unit (DPU); the second semiconductor IP 130 may be a graphics processing unit (GPU); and, the third semiconductor IP 140 may be a neural processing unit (NPU). However, it is not limited thereto.

The first semiconductor IP 120 outputs a first semiconductor IP request REQa to the IOMMU 200; the second semiconductor IP 130 outputs a second semiconductor IP request REQb to the IOMMU 200; and the third semiconductor IP 140 outputs a third semiconductor IP request REQc to the IOMMU 200. Here, a request may mean a write request or a read request, and the request may also mean a command or a transaction request. Each of the semiconductor IP requests REQa, REQb, and REQc includes at least one semiconductor IP request.

The IOMMU 200 translates a virtual address VAi (where 'i' is a natural number), which is included in each of the semiconductor IP requests REQa, REQb, and REQc, into a physical address PAi (where 'i' is a natural number) and writes data to the memory device 300 or reads data from the memory device 300 by using the physical address PAi. The memory device 300 may be implemented with a dynamic random access memory (DRAM) used as a system memory device.

Figure 2:
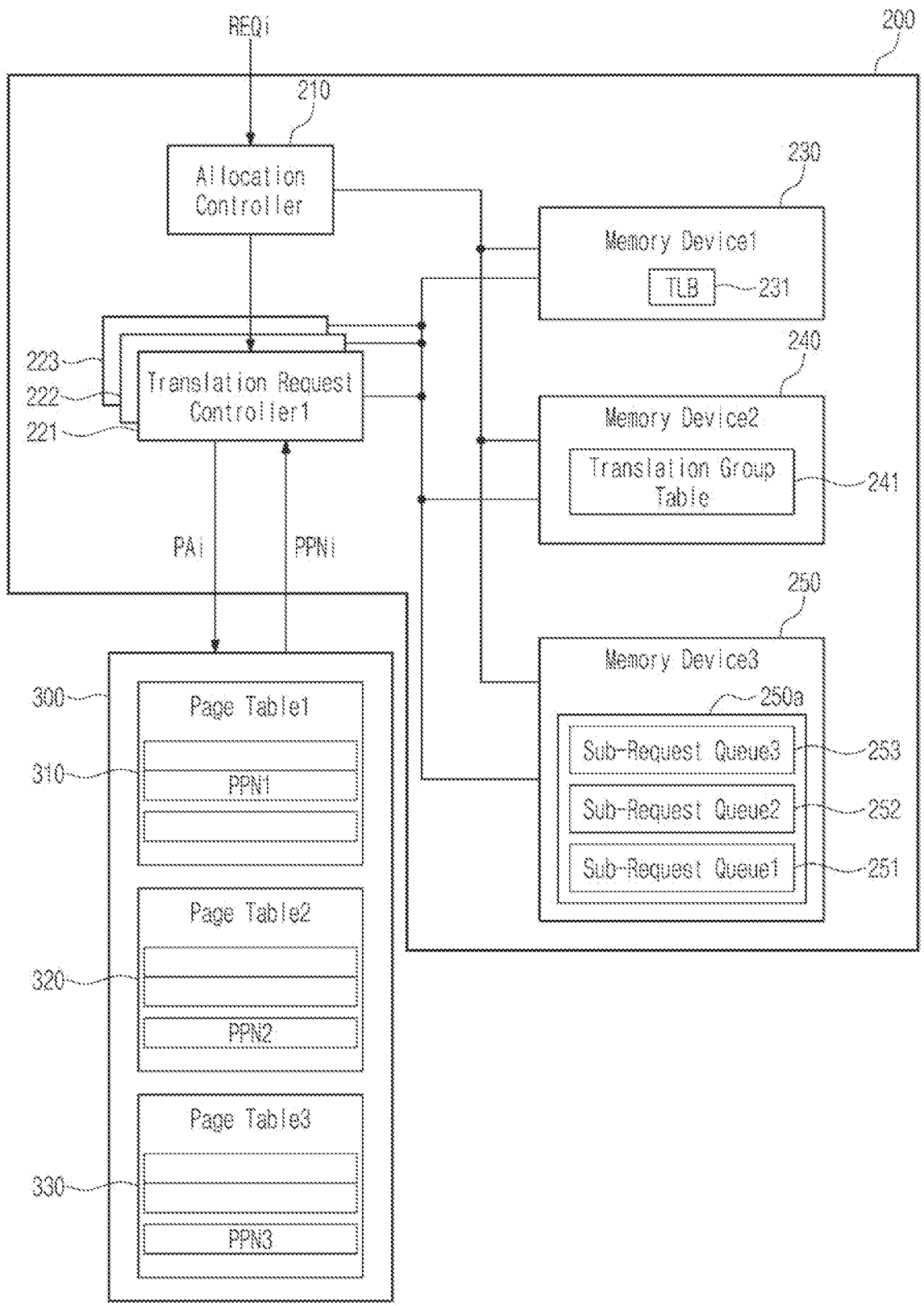
FIG. 2 is a detailed diagram of an IOMMU and a memory device, according to an embodiment.

As illustrated in FIG. 2, the memory device 300 stores a plurality of page tables 310, 320, and 330. The first page table 310 is uniquely identified by a first page table identifier (ID) PTID1; the second page table 320 is uniquely identified by a second page table ID PTID2; and, the third page table 330 is uniquely identified by a third page table ID PTID3.

As illustrated in FIG. 2, the first page table 310 stores physical page numbers including a first physical page number PPN1, the second page table 320 stores physical page numbers including a second physical page number PPN2, and the third page table 330 stores physical page numbers including a third physical page number PPN3.

The device 400 may be a display capable of receiving and displaying data output from the first semiconductor IP 120. According to an embodiment, the device 400 may be connected to one of the second semiconductor IP 130 and third semiconductor IP 140, and the device 400 may be an input/output device or an image sensor.

FIG. 2 is a detailed diagram of an IOMMU and a memory device, according to an embodiment.

Referring to FIGS. 1 and 2, the IOMMU 200 includes an allocation controller 210, a plurality of translation request controllers 221, 222, and 223, a first memory device 230 storing a TLB 231, a second memory device 240 storing the translation group table 241, and a third memory device 250 storing a sub-request queue group 250a.

The allocation controller 210 may receive a plurality of requests, each of which includes a page and a page offset, may determine the page included in each of the received plurality of requests, may group (or classify) the plurality of requests for each page based on the determination result, and may store the classified page and a page offset corresponding to the classified page in a sub-request queue.

According to an embodiment, each of the first memory device 230 and the third memory device 250 may be implemented as a static random access memory (SRAM), and the second memory device 240 may be implemented with flip-flops. As the third memory device 250 is implemented with an SRAM, area-cost is minimized.

The sub-request queue group 250a may include a plurality of sub-request queues 251, 252, and 253. In principle, the sub-request queues 251, 252, and 253 may be matched to the translation request controllers 221, 222, and 223 one-to-one, respectively.

However, when the number of requests, each of which includes the same page, is greater than the number of sub-request queue entries included in one sub-request queue (e.g., when the sub-request queue is full), the IOMMU 200 may expand the storage space (or storage capacity) of the sub-request queue by linking at least one of the second sub-request queue 252 and the third sub-request queue 253, which is empty, in a linked list scheme.

Figure 3:
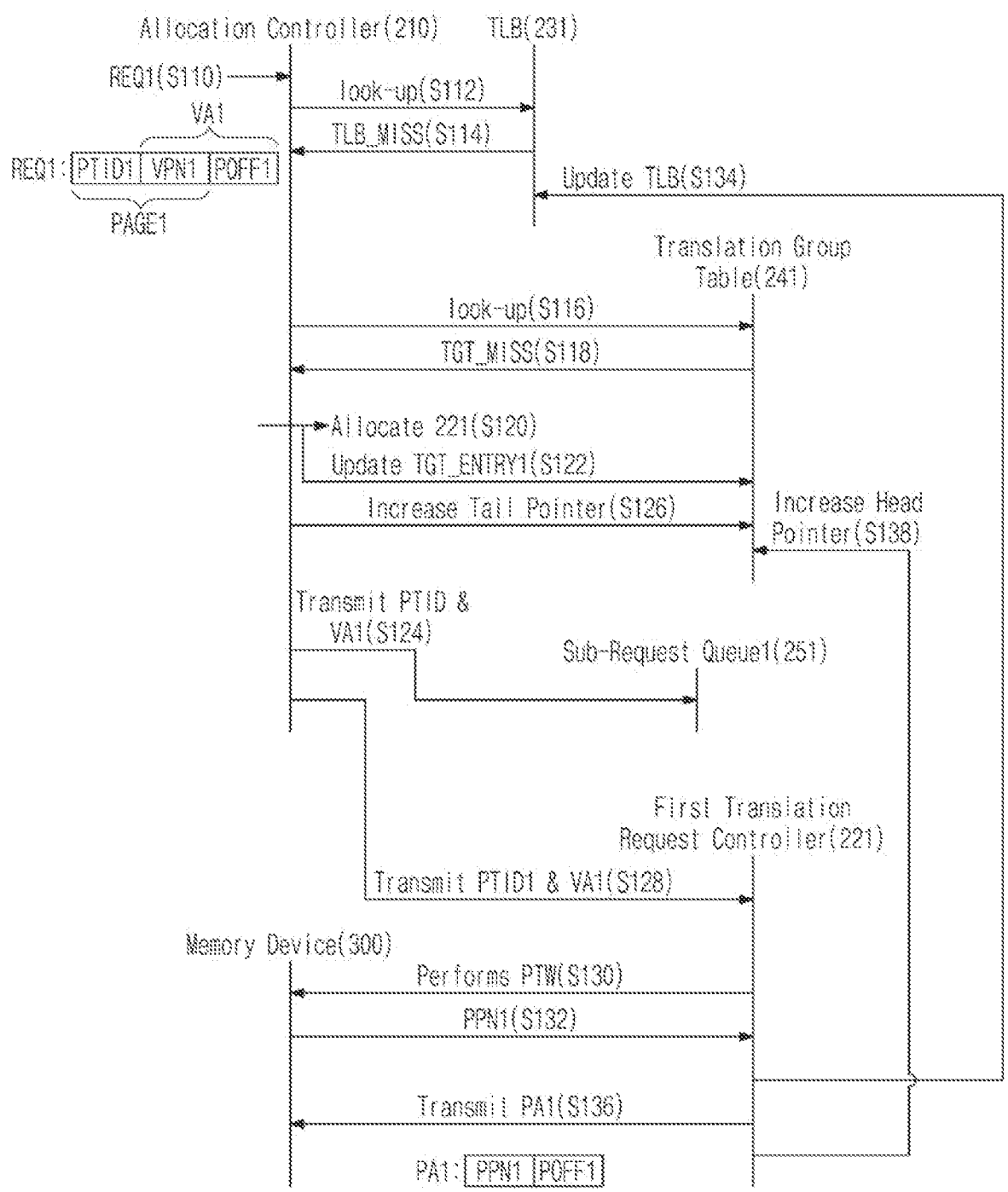
FIG. 3 is a data flow for describing an operation of the SoC, according to an embodiment.

FIG. 3 is a data flow for describing an operation of the SoC, according to an embodiment.

Referring to FIGS. 1 to 3, the allocation controller 210 receives a first request REQ1 (S110). For example, the first request REQ1 may be one of the semiconductor IP requests REQa, REQb, and REQc.

The first request REQ1 includes the first page table ID PTID1 and a first virtual address VA1, and the first virtual address VA1 includes a first virtual page number VPN1 and a first page offset POFF1. A first page PAGE1 includes the first page table ID PTID1 and the first virtual page number VPN1.

Initially, the TLB 231 is empty.

The allocation controller 210 receives the first request REQ1 including the first page table ID PTID1, the first virtual page number VPN1, and the first page offset POFF1 (S110), looks up (searches for) the TLB 231 by using the first page table ID PTID1 and the first virtual page number VPN1 (S112), looks up the translation group table 241 by using the first page table ID PTID1 and the first virtual page number VPN1 (S116) when a TLB miss TLB MISS for the first request REQ1 occurs (S114), and allocates (selects) the first translation request controller 221 among the plurality of translation request controllers 221, 222, and 223 (S120) when a translation group table miss TGT MISS for the first request REQ1 occurs (S118).

After the allocation controller 210 allocates the first translation request controller 221 (S120), the allocation controller 210 updates a first translation group table entry TGT_ENTRY1 included in the translation group table 241 (S122). Here, an entry may mean a memory area, in which information or data is stored, or data itself stored in the memory area.

FIG. 4 illustrates data stored in a translation group table, according to an embodiment. Initially, the first translation group table entry TGT_ENTRY1 is initialized.

Referring to FIGS. 2 to 4, the allocation controller 210 changes a value of a valid field FD1 included in the first translation group table entry TGT_ENTRY1 from logic 0 to logic 1, stores the first page table ID PTID1 and the first virtual page number VPN1 in the first translation group table entry TGT_ENTRY1 (S122), and updates a value of a tail pointer (S126). For example, when the first virtual address VA1 is received, the allocation controller 210 increases the value of the tail pointer by a first value (e.g., decimal 1).

For example, whenever a virtual address including a page table ID and a virtual page number is input, the allocation controller 210 increases the value of the tail pointer by the first value. However, whenever a physical page number corresponding to the virtual page number is output to the memory device 300, the allocation controller 210 increases a value of a head pointer by the first value.

The translation group table entry TGT_ENTRY includes the valid field FD1, a page table ID field FD2, a virtual page number field FD3, a second pointer field FD4, a first pointer field FD5, a field FD6 indicating whether the next sub-request queue thus linked is present (next sub-request queue field FD6), and a field FD7 indicating a next sub-request queue ID thus linked (next sub-request queue ID field FD7).

The valid field FD1 indicates whether the corresponding translation group table entry is valid. In the valid field FD1, logic (data) 1 indicates validity, and logic 0 indicates invalidity.

For example, when a value of a tail pointer is the same as a value of a head pointer, a value of the valid field FD1 may be set to logic 0. When the value of the tail pointer is different from the value of the head pointer, the value of the valid field FD1 may be set to logic 1.

The page table ID field FD2 indicates a page table ID to be used at address translation. When a value of the next sub-request queue field FD6 is set to logic 1, the next sub-request queue field FD6 indicates that the next sub-request queue is present. When the value of the next sub-request queue field FD6 is set to logic 0, the next sub-request queue field FD6 indicates that the next sub-request queue is not present. A value of the next sub-request queue ID field FD7 indicates the next sub-request queue ID thus linked. Detailed examples regarding the value of the next sub-request queue field FD6 and the value of the next sub-request queue ID field FD7 will be described in detail with reference to FIGS. 16 to 18.

Figure 5:
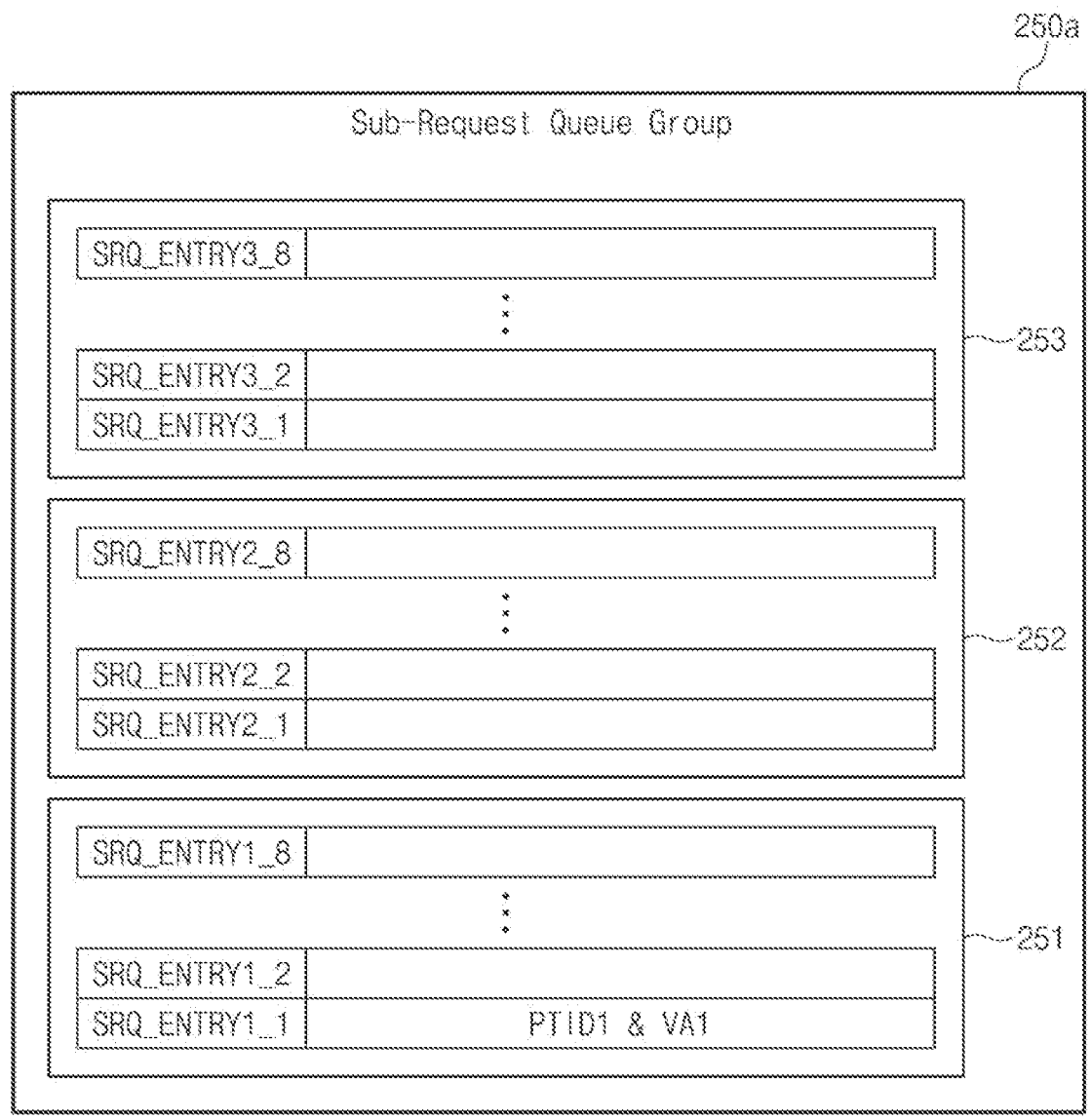
FIG. 5 illustrates data stored in sub-request queues, according to an embodiment.

FIG. 5 illustrates data stored in sub-request queues, according to an embodiment.

Referring to FIGS. 1 to 5, the allocation controller 210 stores the first page table ID PTID1 and the first virtual address VA1 in a first sub-request queue entry SRQ_ENTRY1_1 of the first sub-request queue 251 allocated (selected) to the first translation request controller 221 (S124).

Each of the sub-request queues 251, 252, and 253 includes the 'N' sub-request queue entries (e.g., the first sub-request queue 251 includes 8 sub-request queue entries SRQ_ENTRY1_1 to SRQ_ENTRY1_8; the second sub-request queue 252 includes 8 sub-request queue entries SRQ_ENTRY2_1 to SRQ_ENTRY2_8; and, the third sub-request queue 253 includes 8 sub-request queue entries SRQ_ENTRY3_1 to SRQ_ENTRY3_8). Here, 'N' is a natural number. For example, 'N' is 8.

The allocation controller 210 transmits the first page table ID PTID1 and the first virtual address VA1 to the first translation request controller 221 (S128).

The first translation request controller 221 performs PTW on the memory device 300 by using the first page table ID PTID1 and the first virtual page number VPN1 (S130). The first translation request controller 221 obtains the first physical page number PPN1 stored in the first page table 310, which has the first page table ID PTID1, from among the page tables 310, 320, and 330 stored in the memory device 300 by using the first page table ID PTID1 and the first virtual page number VPN1 (S132).

The first translation request controller 221 updates the TLB 231 (S134).

Figure 6:
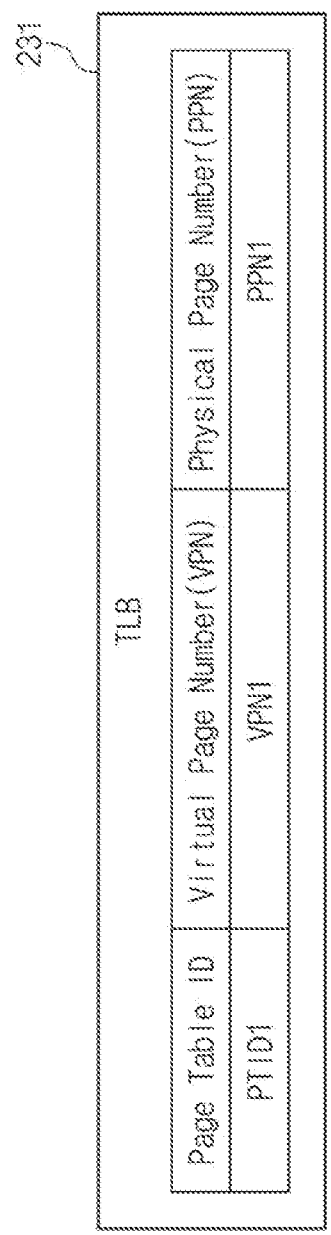
FIG. 6 illustrates data stored in a translation lookaside buffer (TLB), according to an embodiment.

FIG. 6 illustrates data stored in a TLB, according to an embodiment.

Referring to FIGS. 3 and 6, the first translation request controller 221 stores the first page table ID PTID1, the first virtual page number VPN1, and the first physical page number PPN1 in the TLB 231 (S134).

After the first translation request controller 221 generates a first physical address PA1 including the first physical page number PPN1 and the first page offset POFF1, and transmits the first physical address PA1 to the memory device 300 (S136), the first translation request controller 221 updates a value of a head pointer included in the first translation group table entry TGT_ENTRY1 of the translation group table 241 (S138). A value of the head pointer of the first translation group table entry TGT_ENTRY1 of FIG. 4 increases from decimal 0 to decimal 1.

According to an embodiment, because the value of the head pointer is the same as a value of a tail pointer as the head pointer increases to decimal 1, the first translation request controller 221 may change a value of the valid field FD1 from logic 1 to logic 0.

Figure 7:
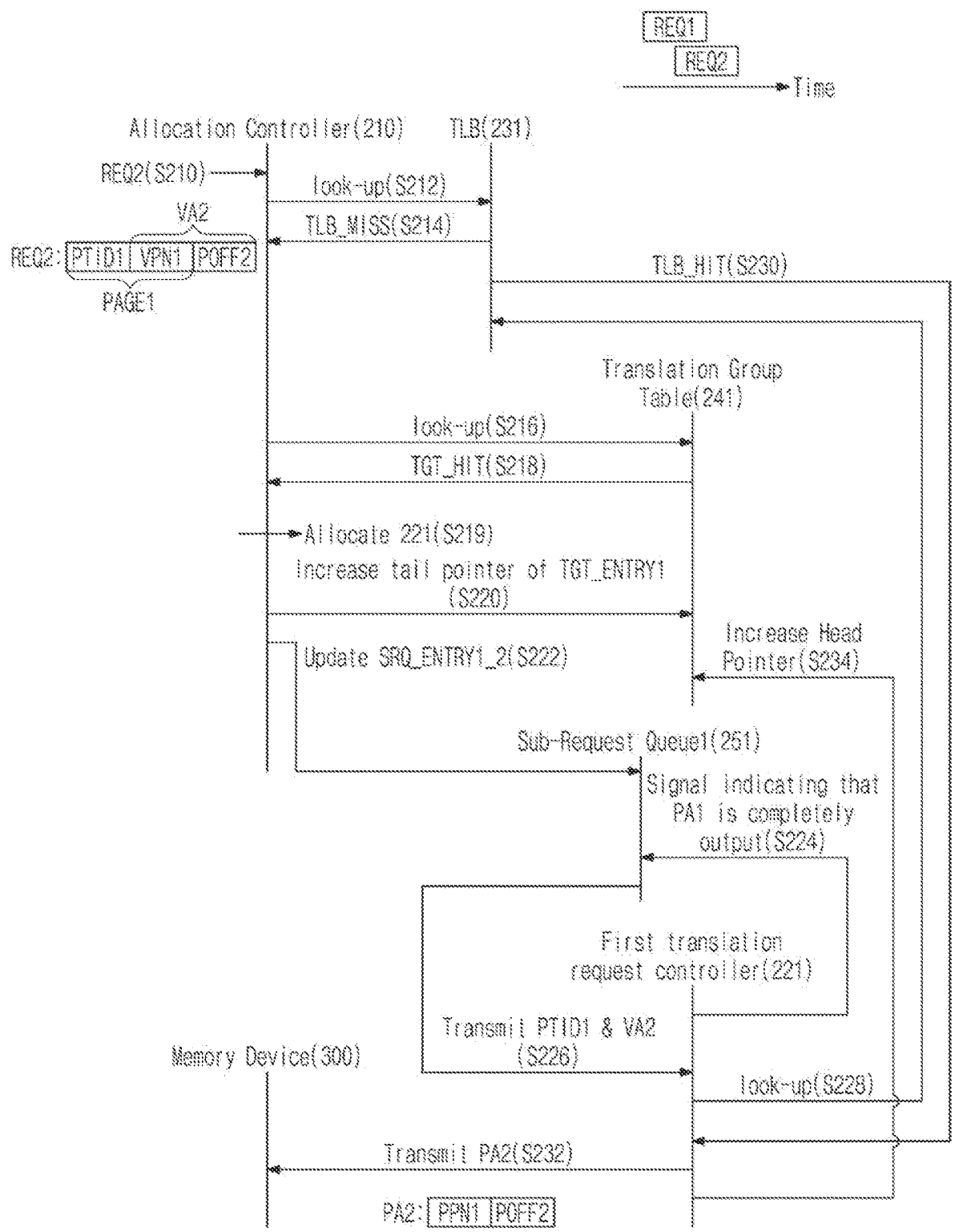
FIG. 7 is a data flow for describing a miss-under-miss operation under a first condition, according to an embodiment.

FIG. 7 is a data flow for describing a miss-under-miss operation under a first condition, according to an embodiment.

The first condition means that a condition that the first page PAGE1 included in a first request REQi ('i'=1) is the same as the first page PAGE1 included in a second request REQi ('i'=2). For example, a second request REQ2 may be one of the semiconductor IP requests REQa, REQb, and REQc.

The second request REQ2 is input to the IOMMU 200 while the first translation request controller 221 performs an operation on the first request REQ1, and operation S134 of FIG. 3 is performed after operation S214 of FIG. 7. For example, the IOMMU 200 may process the first request REQ1 and the second request REQ2 in parallel.

A miss-under-miss operation performed under the first condition will be described in detail with reference to FIGS. 1 to 9.

The allocation controller 210 receives the second request REQ2 (S210). The second request REQ2 includes the first page table ID PTID1 and a second virtual address VA2, and the second virtual address VA2 includes the first virtual page number VPN1 and a second page offset POFF2. As described above, the first page PAGE1 includes the first page table ID PTID1 and the first virtual page number VPN1.

The allocation controller 210 receives the second request REQ2 including the first page table ID PTID1, the first virtual page number VPN1, and the second page offset POFF2 (S210), looks up the TLB 231 by using the first page table ID PTID1 and the first virtual page number VPN1 (S212), and looks up the translation group table 241 by using the first page table ID PTID1 and the first virtual page number VPN1 (S216) when the TLB miss TLB MISS for the second request REQ2 occurs (S214).

In this case, operation S122, operation S124, and operation S126 shown in FIG. 3 have already been performed. The first page table ID PTID1 and the first virtual page number VPN1 are already stored in the first translation group table entry TGT_ENTRY1 of the translation group table 241, and thus a translation group table hit TGT HIT for the second request REQ2 occurs (S218).

The allocation controller 210 that has received the second request REQ2 allocates the first translation request controller 221 from among the plurality of translation request controllers 221, 222, and 223 (S219).

After the allocation controller 210 allocates the first translation request controller 221 (S219), the allocation controller 210 updates the first translation group table entry TGT_ENTRY1 included in the translation group table 241 (S220).

FIG. 8 illustrates data stored in a translation group table based on a miss-under-miss operation under a first condition, according to an embodiment.

Referring to FIGS. 3, 4, 7, and 8, operation S126, operation S220, operation S138, and operation S234 are sequentially performed.

The allocation controller 210 updates a tail pointer included in the first translation group table entry TGT_ENTRY1 (S220). For example, because the second virtual address VA2 is received after the first virtual address VA1 is received, the allocation controller 210 increases a value of the tail pointer by the first value again (S220). Accordingly, as shown in FIG. 8, the value of the tail pointer is changed from decimal 1 to decimal 2 (S220).

Figure 9:
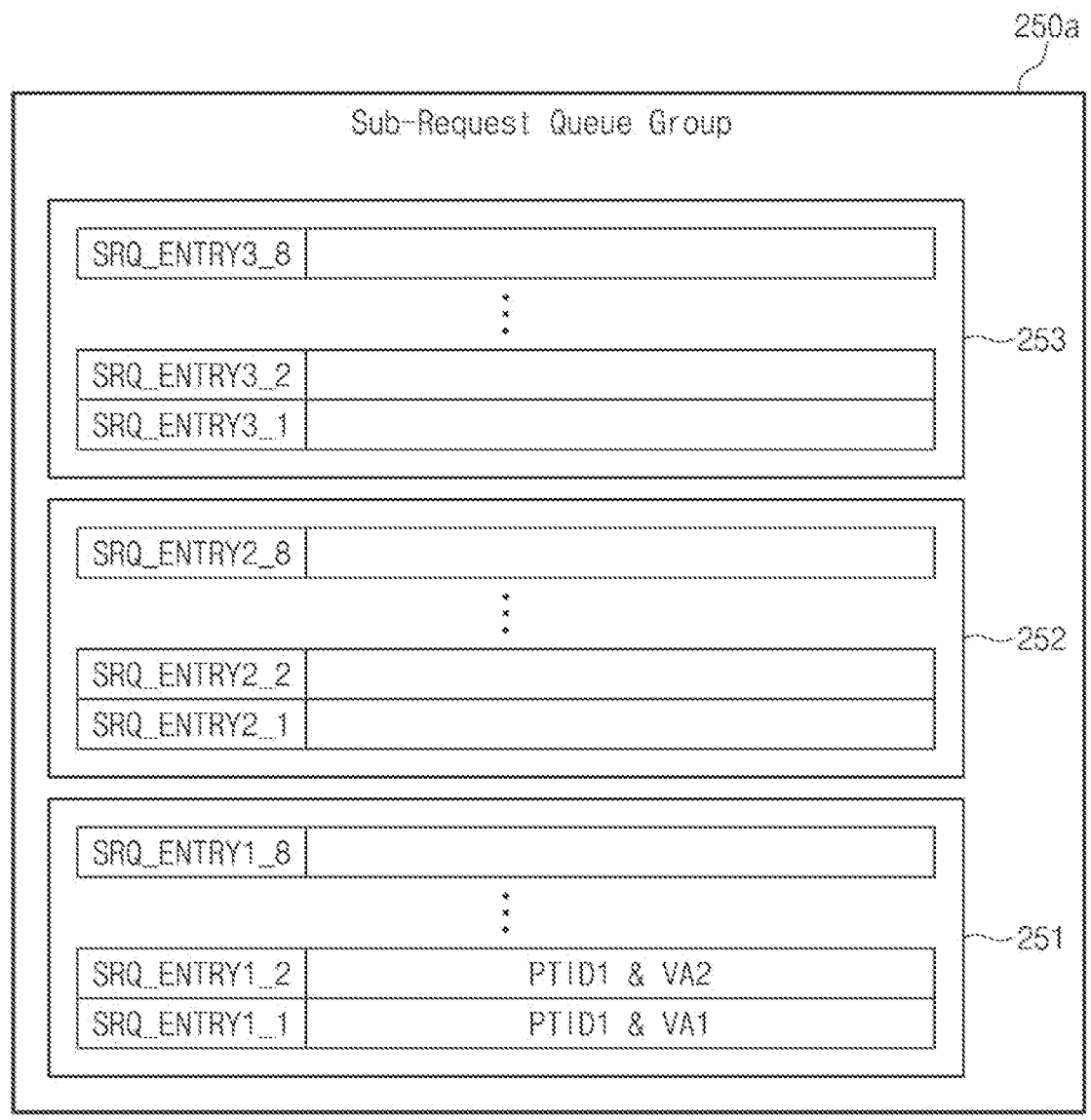
FIG. 9 illustrates data stored in sub-request queues based on a miss-under-miss operation under a first condition, according to an embodiment.

FIG. 9 illustrates data stored in sub-request queues based on a miss-under-miss operation under a first condition, according to an embodiment.

Referring to FIGS. 7 and 9, the allocation controller 210 updates a second sub-request queue entry SRQ_ENTRY1_2 of the first sub-request queue 251 (S222). For example, the allocation controller 210 stores the first page table ID PTID1 and the second virtual address VA2 in the second sub-request queue entry SRQ_ENTRY1_2 of the first sub-request queue 251 allocated to the first translation request controller 221 (S222).

The allocation controller 210 does not transmit the first page table ID PTID1 and the second virtual address VA2, which are included in the second request REQ2, to the first translation request controller 221.

As illustrated in FIG. 1, when the first physical address PA1 for the first request REQ1 is output to the memory device 300 (S136), and a value of a head pointer included in the first translation group table entry TGT_ENTRY1 increases from decimal 0 to decimal 1 (S138), the first translation request controller 221 transmits, to the first sub-request queue 251, a signal indicating that the first physical address PA1 is completely output to the memory device 300 (S224).

The first translation request controller 221 obtains the first page table ID PTID1 and the second virtual address VA2 from the second sub-request queue entry SRQ_ENTRY1_2 of the first sub-request queue 251 (S226).

The first translation request controller 221 looks up the TLB 231 shown in FIG. 6 by using the first page table ID PTID1 and the first virtual page number VPN1 (S228).

The first page table ID PTID1, the first virtual page number VPN1, and the first physical page number PPN1 are stored in the TLB 231 as shown in FIG. 6 between operation S214 and operation S228, and thus the TLB hit TLB HIT occurs (S230).

The first translation request controller 221 receives the first physical page number PPN1 from the TLB 231, generates a second physical address PA2 including the first physical page number PPN1 and the second page offset POFF2, and transmits the second physical address PA2 to the memory device 300 (S232). Afterwards, the first translation request controller 221 updates a head pointer included in the first translation group table entry TGT_ENTRY1 of the translation group table 241 (S234). As illustrated in FIG. 8, a value of the head pointer increases from decimal 1 to decimal 2 (S234).

According to an embodiment, because the value of the head pointer is the same as a value of a tail pointer as the value of the head pointer increases from decimal 1 to decimal 2, the first translation request controller 221 may change a value of the valid field FD1 of the first translation group table entry TGT_ENTRY1 from logic 1 to logic 0.

As shown in FIG. 7, while processing the second request REQ2, the first translation request controller 221 does not perform PTW.

Figure 10:
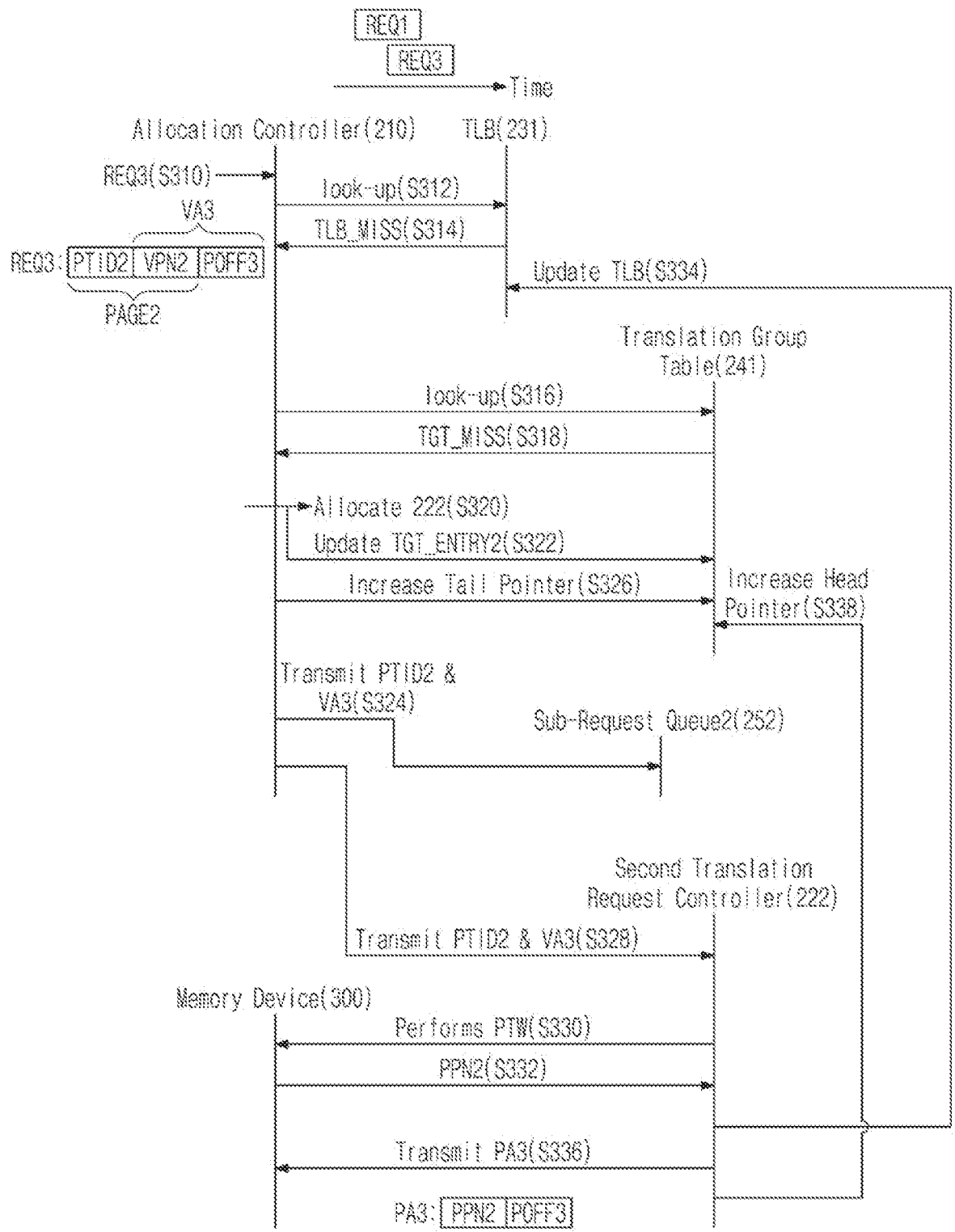
FIG. 10 is a data flow for describing a miss-under-miss operation under a second condition, according to an embodiment.

FIG. 10 is a data flow for describing a miss-under-miss operation under a second condition, according to an embodiment.

The second condition means that a condition that the first page PAGE1 included in the first request REQ1 is different from a second page PAGE2 included in a third request REQi ('i'=3). For example, a third request REQ3 may be one of the semiconductor IP requests REQa, REQb, and REQc.

The third request REQ3 is input to the IOMMU 200 while the first translation request controller 221 performs an operation on the first request REQ1.

Accordingly, an operation of the second translation request controller 222 translating a third virtual address VA3 into a third physical address PA3 is performed independently of an operation of the first translation request controller 221 translating the first virtual address VA1 into the first physical address PA1. For example, the IOMMU 200 may process the first request REQ1 and the third request REQ3 in parallel.

A miss-under-miss operation performed under the second condition will be described in detail with reference to FIGS. 1 to 6 and 10.

The allocation controller 210 receives the third request REQ3 including the second page table ID PTID2, a second virtual page number VPN2, and a third page offset POFF3 (S310), looks up the TLB 231 by using the second page table ID PTID2 and the second virtual page number VPN2 (S312), looks up the translation group table 241 by using the second page table ID PTID2 and the second virtual page number VPN2 (S316) when the TLB miss TLB MISS for the third request REQ3 occurs (S314), and allocates the second translation request controller 222 among the plurality of translation request controllers 221, 222, and 223 (S320) when the translation group table miss TGT MISS for the third request REQ3 occurs (S318).

After the allocation controller 210 that has received the third request REQ3 allocates the second translation request controller 222 (S320), the allocation controller 210 updates a second translation group table entry TGT_ENTRY2 included in the translation group table 241 (S322).

FIG. 11 illustrates data stored in a translation group table based on a miss-under-miss operation under a second condition, according to an embodiment. Initially, the second translation group table entry TGT_ENTRY2 is initialized.

Referring to FIGS. 10 and 11, the allocation controller 210 changes a value of the valid field FD1 included in the second translation group table entry TGT_ENTRY2 from logic 0 to logic 1, stores the second page table ID PTID2 and the second virtual page number VPN2 in the second translation group table entry TGT_ENTRY2 (S322), and updates a tail pointer of the second translation group table entry TGT_ENTRY2 (S326). For example, when the third virtual address VA3 is received, the allocation controller 210 increases a value of the tail pointer of the second translation group table entry TGT_ENTRY2 by a first value.

Figure 12:
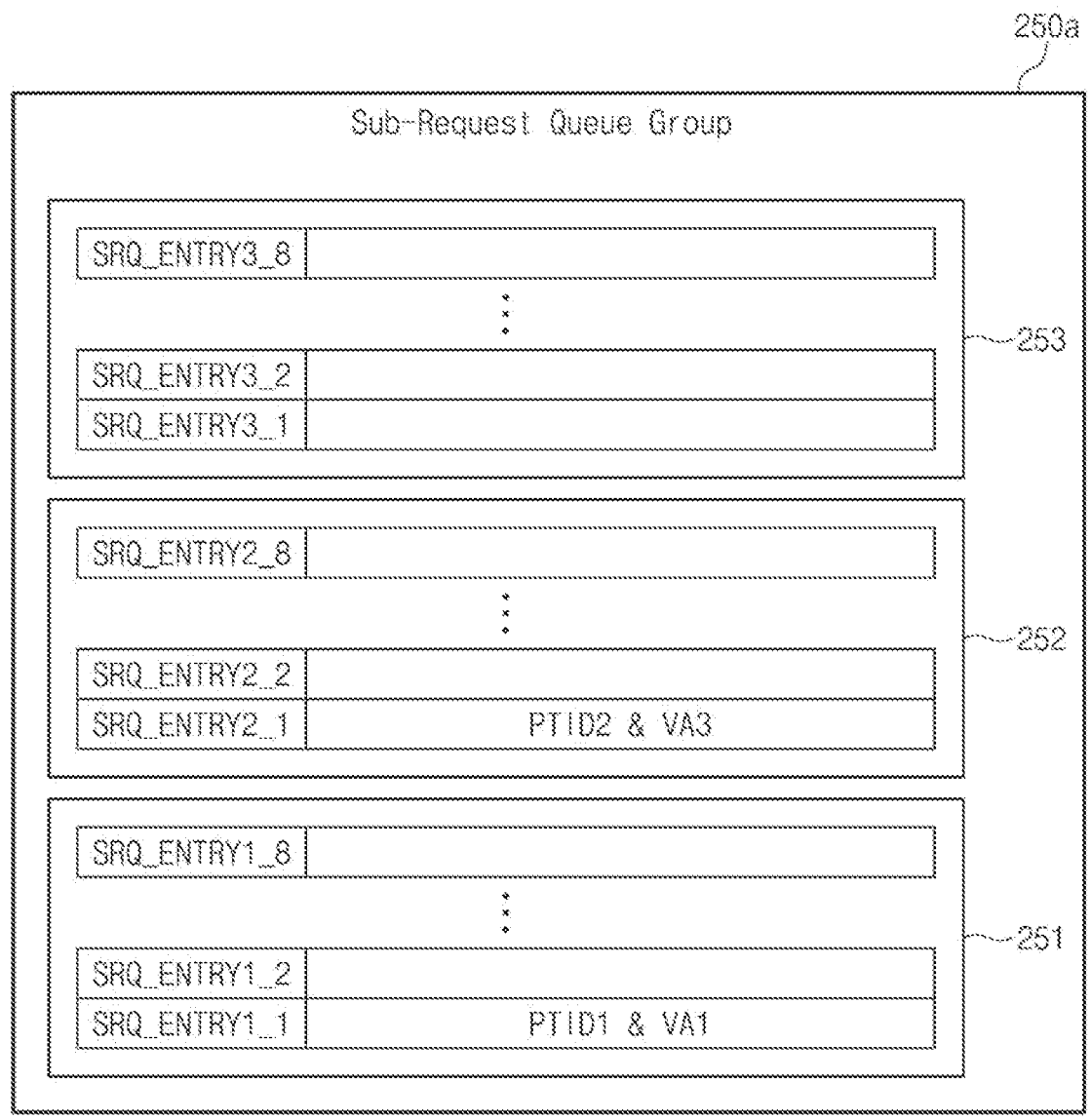
FIG. 12 illustrates data stored in sub-request queues based on a miss-under-miss operation under a second condition, according to an embodiment.

FIG. 12 illustrates data stored in sub-request queues based on a miss-under-miss operation under a second condition, according to an embodiment.

Referring to FIGS. 10 and 12, the allocation controller 210 stores the second page table ID PTID2 and the third virtual address VA3 in the first sub-request queue entry SRQ_ENTRY2_1 of the second sub-request queue 252 allocated to the second translation request controller 222 (S324).

The allocation controller 210 transmits the second page table ID PTID2 and the third virtual address VA3 to the second translation request controller 222 (S328).

The second translation request controller 222 performs PTW on the memory device 300 by using the second page table ID PTID2 and the second virtual page number VPN2 (S330). The second translation request controller 222 obtains the second physical page number PPN2 stored in the second page table 320, which has the second page table ID PTID2, from among the page tables 310, 320, and 330, which are stored in the memory device 300, by using the second page table ID PTID2 and the second virtual page number VPN2 (S332).

As shown in FIG. 13, the second translation request controller 222 updates the TLB 231 (S334).

FIG. 13 illustrates data stored in a TLB based on a miss-under-miss operation under a second condition, according to an embodiment.

Referring to FIGS. 10 and 13, the second translation request controller 222 stores the second page table ID PTID2, the second virtual page number VPN2, and the second physical page number PPN2 in the TLB 231 (S334).

The second translation request controller 222 generates the third physical address PA3 including the second physical page number PPN2 and the third page offset POFF3 and transmits the third physical address PA3 to the memory device 300 (S336). Afterwards, the second translation request controller 222 updates a head pointer included in the second translation group table entry TGT_ENTRY2 of the translation group table 241 (S338). Accordingly, a value of the head pointer of the second translation group table entry TGT_ENTRY2 increases from decimal 0 to decimal 1 (S338).

According to an embodiment, because the value of the head pointer is the same as a value of the tail pointer as the value of the head pointer increases from decimal 0 to decimal 1, the second translation request controller 222 may change the value of the valid field FD1 from logic 1 to logic 0.

Figure 14:
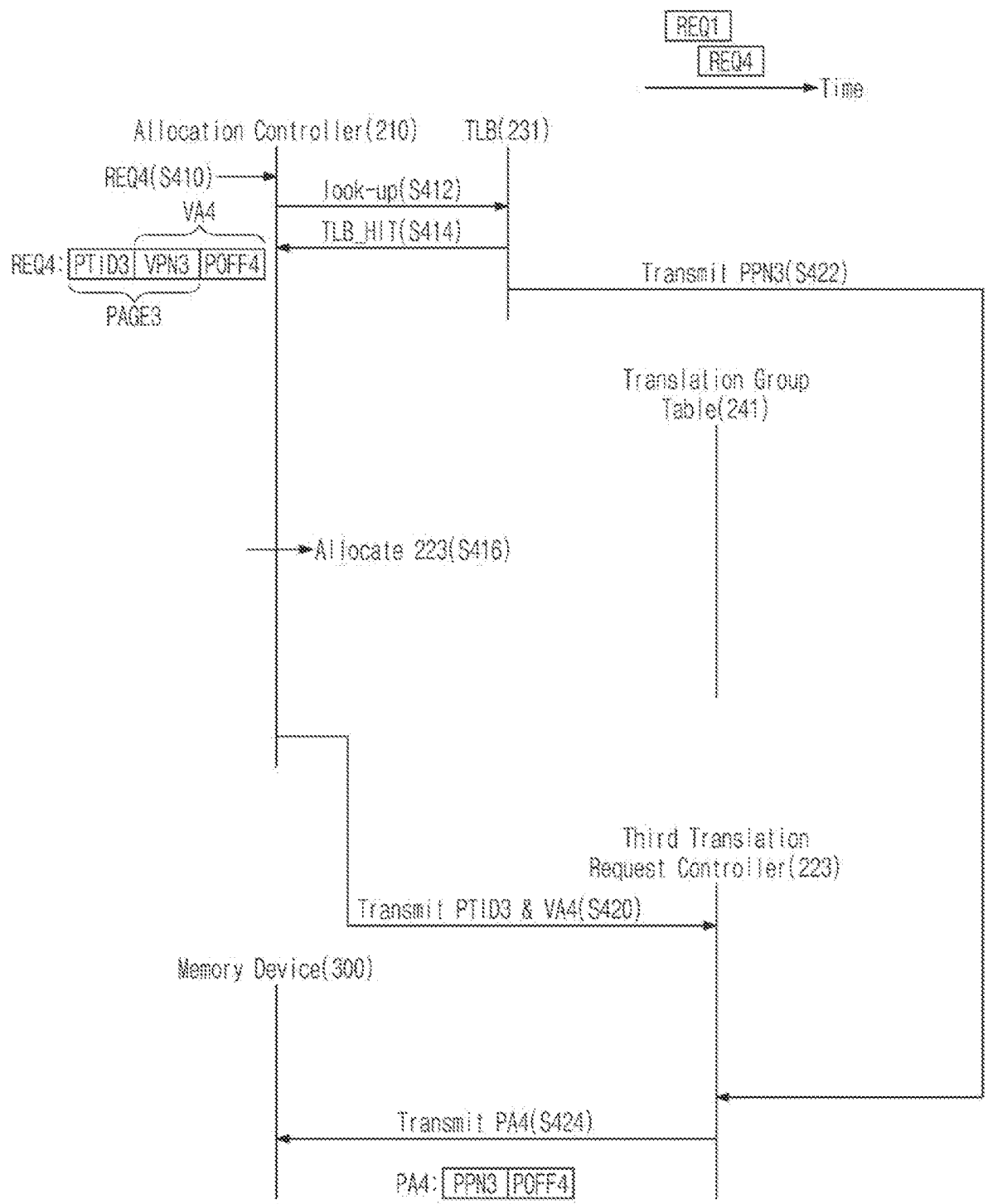
FIG. 14 is a data flow for describing a hit-under-miss operation, according to an embodiment.

FIG. 14 is a data flow for describing a hit-under-miss operation, according to an embodiment.

A fourth request REQi ('i'=4) is input to the IOMMU 200 while the first translation request controller 221 performs an operation on the first request REQ1.

Accordingly, an operation of the third translation request controller 223 translating a fourth virtual address VA4 into a fourth physical address PA4 is performed independently of an operation of the first translation request controller 221 translating the first virtual address VA1 into the first physical address PA1. For example, the IOMMU 200 may process the first request REQ1 and a fourth request REQ4 in parallel.

A hit-under-miss operation will be described in detail with reference to FIGS. 1 to 6, and FIG. 14.

Figure 15:
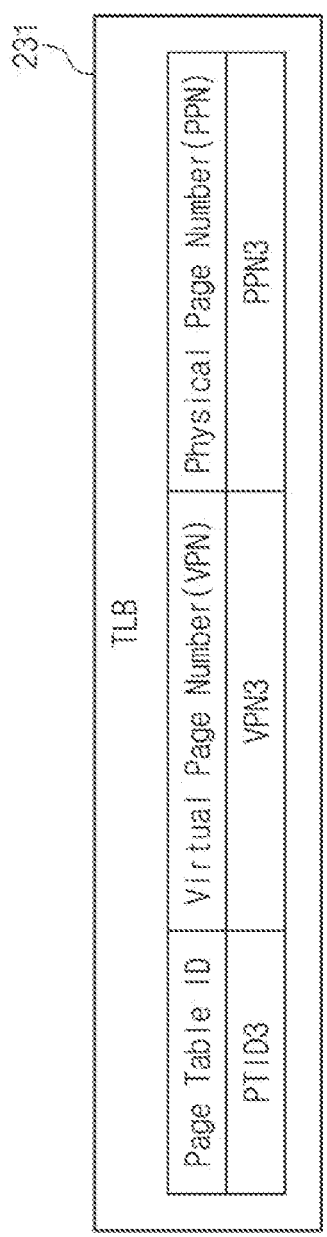
FIG. 15 illustrates data stored in a TLB for a hit-under-miss operation, according to an embodiment.

FIG. 15 illustrates data stored in a TLB for a hit-under-miss operation, according to an embodiment.

Referring to FIGS. 14 and 15, the third page table ID PTID3, a third virtual page number VPN3, and the third physical page number PPN3 are already stored in the TLB 231 before operation S412 is performed.

The allocation controller 210 receives the fourth request REQ4 including the third page table ID PTID3, the third virtual page number VPN3, and a fourth page offset POFF4 (S410), looks up the TLB 231 by using the third page table ID PTID3 and the third virtual page number VPN3 (S412), and allocates the third translation request controller 223 among the plurality of translation request controllers 221, 222, and 223 (S416) when the TLB hit TLB HIT for the fourth request REQ4 occurs (S414).

The allocation controller 210 that has received the fourth request REQ4 transmits the third page table ID PTID3 and the fourth virtual address VA4 to the third translation request controller 223 (S420).

The third translation request controller 223 receives the third physical page number PPN3 from the TLB 231 (S422), generates the fourth physical address PA4 including the third physical page number PPN3 and the fourth page offset POFF4, and transmits the fourth physical address PA4 to the memory device 300 (S424).

Figure 16:
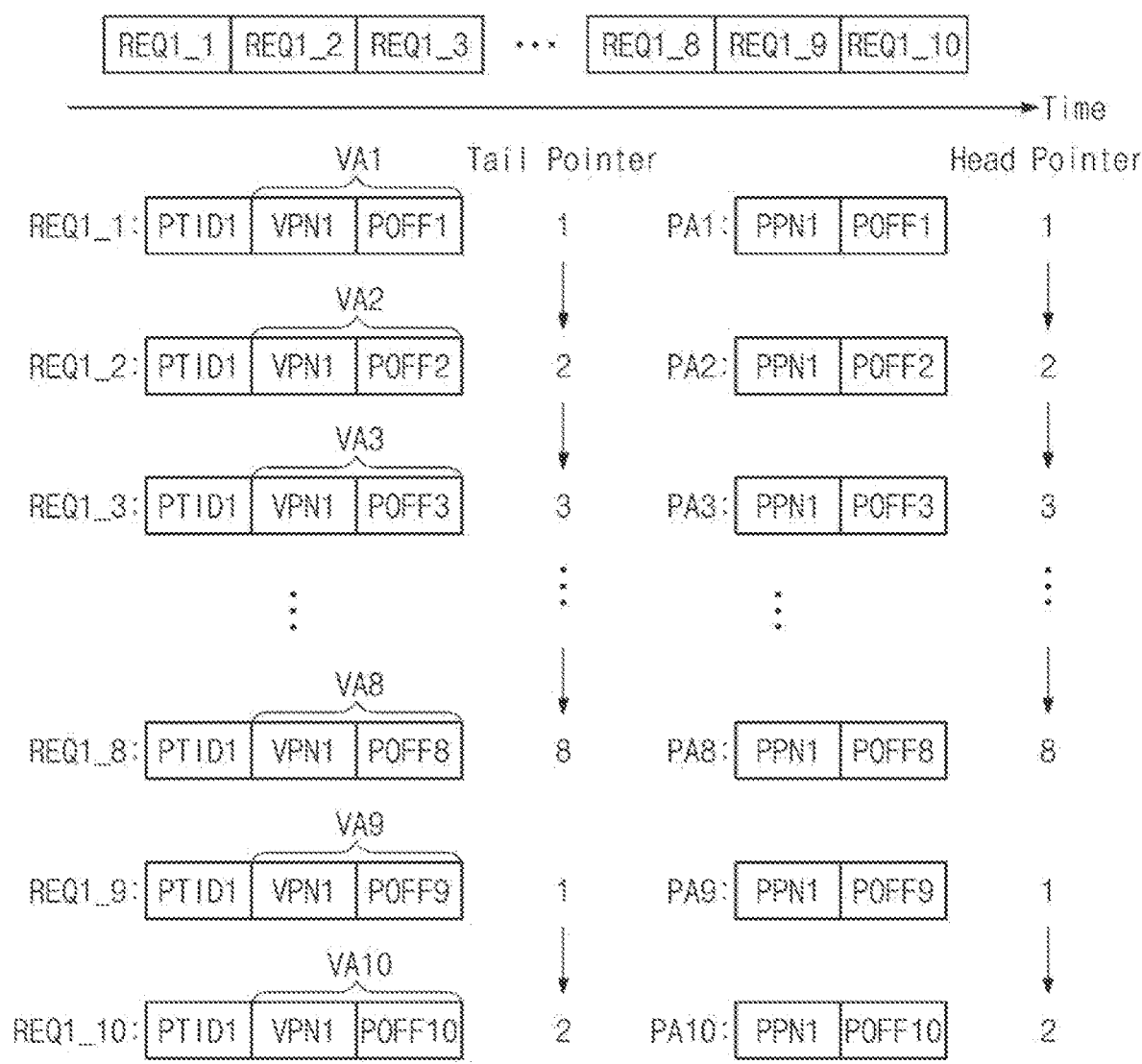
FIG. 16 illustrates successive requests for describing linked sub-request queues and physical addresses corresponding to the requests, according to an embodiment.

FIG. 16 illustrates successive requests for describing linked sub-request queues and physical addresses corresponding to the requests, according to an embodiment.

The allocation controller 210 sequentially receives a plurality of requests REQ1_1 to REQ1_10. Each of the requests REQ1_1 to REQ1_10 may be one of the semiconductor IP requests REQa, REQb, and REQc. For example, after performing PTW on the request REQ1_1, the IOMMU 200 sequentially processes the requests REQ1_2 to REQ1_10, and does not perform PTW on the requests REQ1_2 to REQ1_10.

The first page table ID PTID1 and the first virtual page number VPN1, which are included in each of the requests REQ1_1 to REQ1_10, are the same as one another, page offsets POFF1 to POFF10 included in each of the requests REQ1_1 to REQ1_10 are different from one another, and the first translation request controller 221 is allocated.

As described with reference to FIG. 3, a TLB miss for the first request REQ1_1 occurs and a translation group table miss for the first request REQ1_1 occurs. Moreover, a TLB miss for each of the first requests REQ1_2 to RRQ1_10 occurs and a translation group table hit for each of the first requests REQ1_2 to RRQ1_10 occurs.

Figure 18:
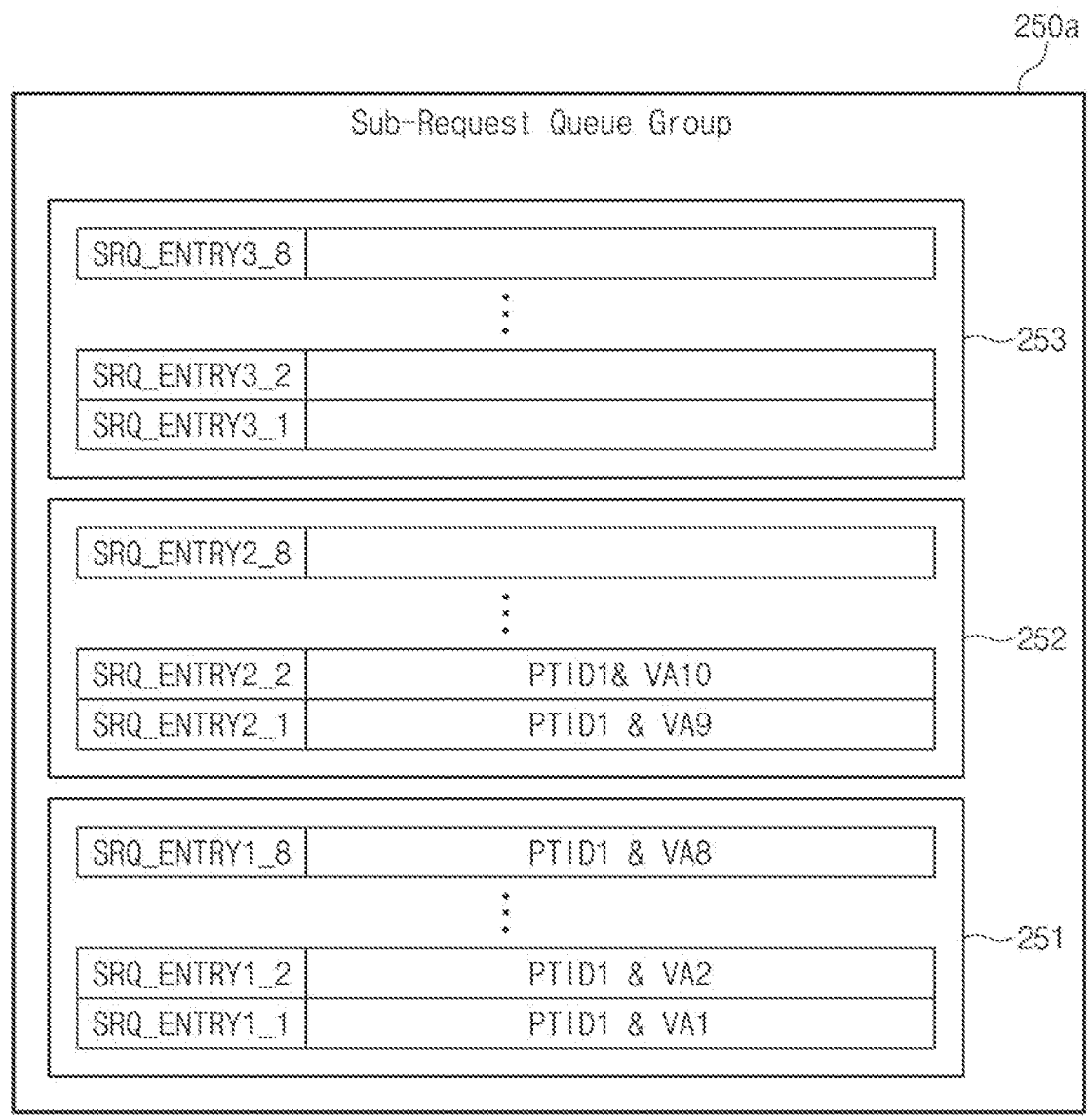
FIG. 18 illustrates data stored in sub-request queues according to successive requests for describing linked sub-request queues, according to an embodiment.

FIG. 17 illustrates data stored in a translation group table according to successive requests for describing linked sub-request queues, according to an embodiment. FIG. 18 illustrates data stored in sub-request queues according to successive requests for describing linked sub-request queues, according to an embodiment.

Initially, each of the translation group table entries TGT_ENTRY1 and TGT_ENTRY2 is initialized.

Referring to FIGS. 3, 7, 16, 17, and 18, when the first virtual address VA1 is received, the allocation controller 210 changes a value of the valid field FD1 included in the first translation group table entry TGT_ENTRY1 from logic 0 to logic 1, stores the first page table ID PTID1 and the first virtual page number VPN1 in the first translation group table entry TGT_ENTRY1, and updates a value of a tail pointer from decimal 0 to decimal 1.

As described with reference to FIG. 3, the allocation controller 210 stores the first page table ID PTID1 and the first virtual address VA1 in the first sub-request queue entry SRQ_ENTRY1_1 of the first sub-request queue 251 and transmits the first page table ID PTID1 and the first virtual address VA1 to the first translation request controller 221.

When the second virtual address VA2 is received, the allocation controller 210 updates the value of the tail pointer of the first translation group table entry TGT_ENTRY1 to decimal 2, stores the first page table ID PTID1 and the second virtual address VA2 in the second sub-request queue entry SRQ_ENTRY1_2 of the first sub-request queue 251, and does not transmit the first page table ID PTID1 and the second virtual address VA2 to the first translation request controller 221.

When the third virtual address VA3 is received, the allocation controller 210 updates the value of the tail pointer of the first translation group table entry TGT_ENTRY1 to decimal 3, stores the first page table ID PTID1 and the third virtual address VA3 in the third sub-request queue entry SRQ_ENTRY1_3 of the first sub-request queue 251, and does not transmit the first page table ID PTID1 and the third virtual address VA3 to the first translation request controller 221.

When each of virtual addresses VA4 to VA7 is received, the allocation controller 210 sequentially updates the value of the tail pointer of the first translation group table entry TGT_ENTRY1 to decimal 4, decimal 5, decimal 6, and decimal 7, respectively stores the first page table ID PTID1 and the virtual addresses VA4 to VA7 in the sub-request queue entries SRQ_ENTRY1_4 to SRQ_ENTRY1_7 of the first sub-request queue 251, and does not transmit the first page table ID PTID1 and the virtual addresses VA4 to VA7 to the first translation request controller 221.

When an eighth virtual address VA8 is received, the allocation controller 210 updates the value of the tail pointer of the first translation group table entry TGT_ENTRY1 to decimal 8, stores the first page table ID PTID1 and the eighth virtual address VA8 in the eighth sub-request queue entry SRQ_ENTRY1_8 of the first sub-request queue 251, and does not transmit the first page table ID PTID1 and the eighth virtual address VA8 to the first translation request controller 221.

Eight sub-request queue entries SRQ_ENTRY1_1 to SRQ_ENTRY1_8 is present in the first sub-request queue 251. Accordingly, when a ninth virtual address VA9 is received, the allocation controller 210 changes the value of the valid field FD1 included in the second translation group table entry TGT_ENTRY2 from logic 0 to logic 1, stores the first page table ID PTID1 and the first virtual page number VPN1 in the second translation group table entry TGT_ENTRY2, updates the value of the tail pointer from decimal 0 to decimal 1, stores the first page table ID PTID1 and the ninth virtual address VA9 in the first sub-request queue entry SRQ_ENTRY2_1 of the second sub-request queue 252, and does not transmit the first page table ID PTID1 and the ninth virtual address VA9 to the first translation request controller 221.

As illustrated in FIG. 17, when the ninth virtual address VA9 is received, the allocation controller 210 changes the value of the next sub-request queue field FD6 of the first translation group table entry TGT_ENTRY1 from logic 0 to logic 1 and changes the value of the next sub-request queue ID field FD7 to decimal 2. Decimal 2 (e.g., NSRQID=2) corresponds to an ID of the second sub-request queue 252.

When a tenth virtual address VA10 is received, the allocation controller 210 updates the value of the tail pointer of the second translation group table entry TGT_ENTRY2 from decimal 1 to decimal 2, stores the first page table ID PTID1 and the tenth virtual address VA10 in the second sub-request queue entry SRQ_ENTRY2_2 of the second sub-request queue 252, and does not transmit the first page table ID PTID1 and the tenth virtual address VA10 to the first translation request controller 221.

The first translation request controller 221 performs PTW on the memory device 300 by using the first page table ID PTID1 and the first virtual page number VPN1 included in the first request REQ1_1. For example, the first translation request controller 221 obtains the first physical page number PPN1 stored in the first page table 310, which has the first page table ID PTID1, from among the page tables 310, 320, and 330 stored in the memory device 300 by using the first page table ID PTID1 and the first virtual page number VPN1 and stores the first page table ID PTID1, the first virtual page number VPN1, and the first physical page number PPN1 in the TLB 231.

The first translation request controller 221 outputs the first physical address PA1 including the first physical page number PPN1 and the first page offset POFF1 to the memory device 300, and changes a value of a head pointer of the first translation group table entry TGT_ENTRY1 from decimal 0 to decimal 1.

When the first physical address PA1 is output to the memory device 300, the first translation request controller 221 receives the first page table ID PTID1 and the second virtual address VA2 from the second sub-request queue entry SRQ_ENTRY1_2 of the first sub-request queue 251, and receives the first physical page number PPN1 from the TLB 231. The first translation request controller 221 generates the second physical address PA2 including the first physical page number PPN1 and the second page offset POFF2, outputs the second physical address PA2 to the memory device 300, and changes the value of the head pointer of the first translation group table entry TGT_ENTRY1 from decimal 1 to decimal 2.

When the second physical address PA2 is output to the memory device 300, the first translation request controller 221 receives the first page table ID PTID1 and the third virtual address VA3 from the third sub-request queue entry SRQ_ENTRY1_3 of the first sub-request queue 251 and receives the first physical page number PPN1 from the TLB 231. The first translation request controller 221 generates the third physical address PA3 including the first physical page number PPN1 and the third page offset POFF3, outputs the third physical address PA3 to the memory device 300, and changes the value of the head pointer of the first translation group table entry TGT_ENTRY1 from decimal 2 to decimal 3.

When fourth to seventh physical addresses PA4 to PA7 are sequentially output to the memory device 300, the first translation request controller 221 sequentially changes the value of the head pointer of the first translation group table entry TGT_ENTRY1 from decimal 3 to decimal 7.

When the seventh physical address PA7 is output to the memory device 300, the first translation request controller 221 receives the first page table ID PTID1 and the eighth virtual address VA8 from the eighth sub-request queue entry SRQ_ENTRY1_8 of the first sub-request queue 251, and receives the first physical page number PPN1 from the TLB 231.

The first translation request controller 221 generates an eighth physical address PA8 including the first physical page number PPN1 and an eighth page offset POFF8, outputs the eighth physical address PA8 to the memory device 300, and changes the value of the head pointer of the first translation group table entry TGT_ENTRY1 from decimal 7 to decimal 8.

After the eighth physical address PA8 is output to the memory device 300, the first translation request controller 221 changes the value of the next sub-request queue field FD6 of the first translation group table entry TGT_ENTRY1 from logic 1 to logic 0 and changes the value of the valid field FD1 of the first translation group table entry TGT_ENTRY1 from logic 1 to logic 0.

When the eighth physical address PA8 is output to the memory device 300, the first translation request controller 221 receives the first page table ID PTID1 and the ninth virtual address VA9 from the first sub-request queue entry SRQ_ENTRY2_1 of the second sub-request queue 252 and receives the first physical page number PPN1 from the TLB 231. The first translation request controller 221 generates a ninth physical address PA9 including the first physical page number PPN1 and a ninth page offset POFF9, outputs the ninth physical address PA9 to the memory device 300, and changes the value of the head pointer of the second translation group table entry TGT_ENTRY2 from decimal 0 to decimal 1.

When the ninth physical address PA9 is output to the memory device 300, the first translation request controller 221 receives the first page table ID PTID1 and the tenth virtual address VA10 from the second sub-request queue entry SRQ_ENTRY2_2 of the second sub-request queue 252, and receives the first physical page number PPN1 from the TLB 231. The first translation request controller 221 generates a tenth physical address PA10 including the first physical page number PPN1 and the tenth page offset POFF10, outputs the tenth physical address PA10 to the memory device 300, and changes the value of the head pointer of the second translation group table entry TGT_ENTRY2 from decimal 1 to decimal 2.

As described with reference to FIGS. 16 to 18, when the first sub-request queue 251 is full, the storage space (or storage capacity) of the first sub-request queue 251 may be expanded by linking the second sub-request queue 252 or third sub-request queue 253 thus empty in a linked list scheme.

While example embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims and their equivalents. Also, it is intended that such modifications are not to be interpreted independently from the technical idea or prospect of the disclosure.

According to an embodiment of the present disclosure, an IOMMU and a device having the same may maximally process hit-under-miss and miss-under-miss by grouping requests, each of which includes the same page, when providing address translation to semiconductor IPs accessing different memory areas.

At least one of the components, elements, units (collectively "components" in this paragraph) represented by a block in the drawings (e.g., FIGS. 1 and 2) may be embodied as various numbers of hardware, software and/or firmware structures that execute respective functions described above. At least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An input output memory management unit (IOMMU) comprising:
a first memory device comprising a translation lookaside buffer (TLB);
a second memory device comprising a translation group table;
a plurality of translation request controllers, wherein each of the plurality of translation request controllers is configured to perform an address translation operation; and
an allocation controller configured to:
receive a first request comprising a first page table identifier (ID), a first virtual page number, and a first page offset;
look up the TLB by using the first page table ID and the first virtual page number;
based on a TLB miss for the first request occurring, look up the translation group table by using the first page table ID and the first virtual page number; and
based on a translation group table miss for the first request occurring, allocate a first translation request controller among the plurality of translation request controllers.

2. The IOMMU of claim 1, wherein, based on the translation group table miss for the first request occurring, the allocation controller is configured to store the first page table ID and the first virtual page number in a first entry of the translation group table and updates a tail pointer included in the first entry.

3. The IOMMU of claim 2, further comprising:
a third memory device comprising a plurality of sub-request queues,
wherein the allocation controller is configured to store the first page table ID, the first virtual page number, and the first page offset in a first sub-request queue among the plurality of sub-request queues.

4. The IOMMU of claim 3, wherein, based on the translation group table miss for the first request occurring, the allocation controller is configured to transmit the first page table ID, the first virtual page number, and the first page offset to the first translation request controller.

5. The IOMMU of claim 4, wherein the first translation request controller is configured to:
obtain a first physical page number corresponding to the first virtual page number from an external memory device by using the first page table ID and the first virtual page number;
store the first page table ID, the first virtual page number, and the first physical page number in the TLB; and
after generating a first physical address comprising the first physical page number and the first page offset and transmitting the first physical address to the external memory device, update a head pointer included in the first entry.

6. The IOMMU of claim 5, wherein the allocation controller is configured to:
receive a second request comprising a second page table ID, a second virtual page number, and a second page offset;
look up the TLB by using the second page table ID and the second virtual page number;
based on a TLB hit for the second request occurring, allocate a second translation request controller among the plurality of translation request controllers; and transmit the second page table ID, the second virtual page number, and the second page offset to the second translation request controller, and
wherein the second translation request controller is configured to:
receive a second physical page number matched to the second virtual page number from the TLB; and
generate a second physical address comprising the second physical page number and the second page offset and transmit the second physical address to the external memory device.

7. The IOMMU of claim 3, wherein the allocation controller is configured to:
receive a second request comprising the first page table ID, the first virtual page number, and a second page offset;
look up the TLB by using the first page table ID and the first virtual page number included in the second request;
based on a TLB miss for the second request occurring, look up the translation group table by using the first page table ID and the first virtual page number included in the second request; and
based on a translation group table hit for the second request occurring, update the tail pointer included in the first entry again.

8. The IOMMU of claim 7, wherein the allocation controller is configured to store the first page table ID, the first virtual page number, and the second page offset in the first sub-request queue.

9. The IOMMU of claim 8, wherein the first translation request controller is configured to:
receive the first page table ID, the first virtual page number, and the second page offset output from the first sub-request queue;
look up the TLB by using the first page table ID and the first virtual page number output from the first sub-request queue;
receive a first physical page number matched to the first virtual page number from the TLB; and
after generating a second physical address comprising the first physical page number and the second page offset and transmitting the second physical address to an external memory device, update a head pointer included in the first entry.

10. The IOMMU of claim 3, wherein the allocation controller is configured to:
receive a second request comprising a second page table ID, a second virtual page number, and a second page offset;
look up the TLB by using the second page table ID and the second virtual page number included in the second request; and
look up the translation group table by using the second page table ID and the second virtual page number based on a TLB miss for the second request occurring, and allocate a second translation request controller among the plurality of translation request controllers based on a translation group table miss for the second request occurring.

11. The IOMMU of claim 10, wherein, based on the translation group table miss for the second request occurring, the allocation controller is configured to store the second page table ID and the second virtual page number in a second entry of the translation group table and updates a tail pointer included in the second entry, and wherein the allocation controller is configured to store the second page table ID, the second virtual page number, and the second page offset in a second sub-request queue among the plurality of sub-request queues.

12. The IOMMU of claim 11, wherein, based on the translation group table miss for the second request occurring, the allocation controller is configured to transmit the second page table ID, the second virtual page number, and the second page offset to the second translation request controller, and
wherein the second translation request controller is configured to:
obtain a second physical page number corresponding to the second virtual page number from an external memory device by using the second page table ID and the second virtual page number;
store the second page table ID, the second virtual page number, and the second physical page number in the TLB; and
after transmitting a second physical address comprising the second physical page number and the second page offset to the external memory device, update a head pointer included in the second entry.

13. A system on chip (SoC) comprising:
a first semiconductor intellectual property (IP);
at least one second semiconductor IP;
a memory device configured to store a first page table corresponding to a first page table ID; and
an input output memory management unit (IOMMU) connected to the first semiconductor IP, the at least one second semiconductor IP, and the memory device,
wherein the IOMMU comprises:
a first memory device comprising a translation lookaside buffer (TLB);
a second memory device comprising a translation group table;
a third memory device comprising a plurality of sub-request queues;
a plurality of translation request controllers, wherein each of the plurality of translation request controllers is configured to translate a virtual address into a physical address; and
an allocation controller, and
wherein the allocation controller is configured to:
receive a first request comprising the first page table ID, a first virtual page number, and a first page offset from the first semiconductor IP;
look up the TLB by using the first page table ID and the first virtual page number included in the first request;
based on a TLB miss for the first request occurring, look up the translation group table by using the first page table ID and the first virtual page number included in the first request;
based on a translation group table miss for the first request occurring, allocate a first translation request controller among the plurality of translation request controllers;
store the first page table ID and the first virtual page number in a first entry of the translation group table and update a tail pointer included in the first entry; and
store the first page table ID, the first virtual page number, and the first page offset in a first sub-request queue among the plurality of sub-request queues.

14. The SoC of claim 13, wherein the allocation controller is configured to:

receive a second request comprising the first page table ID, the first virtual page number, and a second page offset from the first semiconductor IP or the at least one second semiconductor IP;
look up the TLB by using the first page table ID and the first virtual page number included in the second request;
based on a TLB miss for the second request occurring, look up the translation group table by using the first page table ID and the first virtual page number included in the second request;
based on a translation group table hit for the second request occurring, allocate the first translation request controller among the plurality of translation request controllers;
update the tail pointer of the first entry included in the translation group table again; and
store the first page table ID, the first virtual page number, and the second page offset included in the second request, in the first sub-request queue.

15. The SoC of claim 14, wherein the first translation request controller is configured to:
receive the first page table ID, the first virtual page number, and the first page offset included in the first request, from the allocation controller;
obtain a first physical page number stored in the first page table by using the first page table ID and the first virtual page number included in the first request;
store the first page table ID, the first virtual page number, and the first physical page number in the TLB; and
output a first physical address comprising the first physical page number and the first page offset to the memory device.

16. The SoC of claim 15, wherein the first translation request controller is configured to:
after the first physical address is output to the memory device, receive the first page table ID, the first virtual page number, and the second page offset included in the second request, from the first sub-request queue;
obtain the first physical page number from the TLB; and
output a second physical address comprising the first physical page number and the second page offset to the memory device.

17. The SoC of claim 16, wherein the first translation request controller is configured to:
after the first physical address is output to the memory device, update a head pointer included in the first entry; and
after the second physical address is output to the memory device, update the head pointer again.

18. A data processing system comprising:
a system on chip (SoC) comprising a first semiconductor intellectual property (IP) and at least one second semiconductor IP; and
a device connected to the first semiconductor IP or the at least one second semiconductor IP,
wherein the SoC comprises:
a memory device configured to store a first page table corresponding to a first page table identifier (ID); and
an input output memory management unit (IOMMU) connected to the first semiconductor IP, the at least one second semiconductor IP, and the memory device,
wherein the IOMMU comprises:
a first memory device comprising a translation lookaside buffer (TLB);
a second memory device comprising a translation group table;

a third memory device comprising a plurality of sub-request queues;

a plurality of translation request controllers, wherein each of the plurality of translation request controllers is configured to translate a virtual address into a physical address; and an allocation controller, and wherein the allocation controller is configured to:

receive a first request comprising the first page table ID, a first virtual page number, and a first page offset from the first semiconductor IP;

look up the TLB by using the first page table ID and the first virtual page number included in the first request;

based on a TLB miss for the first request occurring, look up the translation group table by using the first page table ID and the first virtual page number included in the first request;

based on a translation group table miss for the first request occurring, allocate a first translation request controller among the plurality of translation request controllers;

store the first page table ID and the first virtual page number in a first entry of the translation group table and update a tail pointer included in the first entry; and store the first page table ID, the first virtual page number, and the first page offset in a first sub-request queue matched to the first translation request controller, from among the plurality of sub-request queues.

19. The data processing system of claim 18, wherein the allocation controller is configured to:

receive a second request comprising the first page table ID, the first virtual page number, and a second page offset from the first semiconductor IP or the at least one second semiconductor IP;

look up the TLB by using the first page table ID and the first virtual page number included in the second request;

based on a TLB miss for the second request occurring, look up the translation group table by using the first page table ID and the first virtual page number included in the second request;

based on a translation group table hit for the second request occurring, allocate the first translation request controller among the plurality of translation request controllers;

update the tail pointer of the first entry included in the translation group table again; and store the first page table ID, the first virtual page number, and the second page offset included in the second request, in the first sub-request queue.

20. The data processing system of claim 19, wherein the first translation request controller is configured to:

receive the first page table ID, the first virtual page number, and the first page offset included in the first request, from the allocation controller;

obtain a first physical page number stored in the first page table by using the first page table ID and the first virtual page number included in the first request;

store the first page table ID, the first virtual page number, and the first physical page number in the TLB;

output a first physical address comprising the first physical page number and the first page offset to the memory device;

after the first physical address is output to the memory device, receive the first page table ID, the first virtual page number, and the second page offset included in the second request, from the first sub-request queue;

obtain the first physical page number from the TLB;

output a second physical address comprising the first physical page number and the second page offset to the memory device;

after the first physical address is output to the memory device, update a head pointer included in the first entry; and after the second physical address is output to the memory device, update the head pointer again.

* * * * *

UNITED STATES PATENT AND TRADEMARK OFFICE
CERTIFICATE OF CORRECTION

PATENT NO. : 12,032,489 B2
APPLICATION NO. : 18/101352
DATED : July 9, 2024
INVENTOR(S) : Youngseok Kim, Junbeom Jang and Seongmin Jo Page 1 of 1

It is certified that error appears in the above-identified patent and that said Letters Patent is hereby corrected as shown below:

On the Title Page

Please insert the following:
-- (30) Foreign Application Priority Data 5/24/2022 Republic of Korea 10-2022-0063752 --

Signed and Sealed this
Twenty-seventh Day of August, 2024

Katherine Kelly Vidal
*Director of the United States Patent and Trademark Office*